United States Patent
Ishibashi

(10) Patent No.: US 9,036,171 B2
(45) Date of Patent: May 19, 2015

(54) RELAYING DEVICE, IMAGE PROCESSING DEVICE, AND SYSTEM COMPRISING IMAGE PROCESSING DEVICE AND RELAYING DEVICE

(71) Applicant: Masayuki Ishibashi, Nagoya (JP)

(72) Inventor: Masayuki Ishibashi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/170,171

(22) Filed: Jan. 31, 2014

(65) Prior Publication Data

US 2014/0293309 A1 Oct. 2, 2014

(30) Foreign Application Priority Data

Mar. 29, 2013 (JP) ................................. 2013-074506

(51) Int. Cl.
*G06F 3/12* (2006.01)
*G06K 15/02* (2006.01)
*G06T 1/00* (2006.01)
*H04N 1/00* (2006.01)

(52) U.S. Cl.
CPC .... *G06K 15/1809* (2013.01); *H04N 2201/0037* (2013.01); *G06T 1/00* (2013.01); *H04N 1/00244* (2013.01); *H04N 2201/001* (2013.01); *H04N 2201/0094* (2013.01); *H04N 2201/0065* (2013.01); *H04N 1/00278* (2013.01)

(58) Field of Classification Search
None
See application file for complete search history.

(56) References Cited

U.S. PATENT DOCUMENTS

| 7,484,211 | B2 * | 1/2009 | Nakaoka et al. ............... 718/100 |
| 2011/0090535 | A1 | 4/2011 | Towata |
| 2011/0149333 | A1 | 6/2011 | Hong |
| 2012/0033257 | A1 | 2/2012 | Okazawa |

(Continued)

FOREIGN PATENT DOCUMENTS

| EP | 2 498 177 A2 | 9/2012 |
| JP | 2005-269250 A | 9/2005 |

(Continued)

OTHER PUBLICATIONS

U.S. Appl. No. 14/170,114, filed Jan. 31, 2014, entitled "Relaying Device, Image Processing Device, and System Comprising Image Processing Device and Relaying Device", first named inventor: Masayuki Ishibashi.

(Continued)

*Primary Examiner* — Marcus T Riley
(74) *Attorney, Agent, or Firm* — Scully, Scott, Murphy & Presser, PC

(57) ABSTRACT

A relaying device may be configured to communicate with an image processing device and a server via a network. The relaying device may receive, from the image processing device, process identification information. The selected data process may be executed on output data outputted from the image processing device or the server. The relaying device may identify an instruction-module as a selected instruction-module from among a plurality of instruction-modules. The relaying device may execute the selected instruction-module so as to execute the selected data process on the output data. The relaying device may transmit processed data to the server in a case that the output data is outputted from the image processing device. The relaying device may transmit the processed data to the image processing device in a case that the output data is outputted from the server.

15 Claims, 13 Drawing Sheets

(56) References Cited

U.S. PATENT DOCUMENTS

2012/0036570 A1    2/2012   Wada
2012/0057193 A1*   3/2012   Jazayeri et al. .............. 358/1.15
2014/0002836 A1    1/2014   Ishino et al.
2014/0293308 A1*   10/2014  Ishibashi ..................... 358/1.13

FOREIGN PATENT DOCUMENTS

JP    2008-229993 A    10/2008
WO    2011/080994 A1    7/2011
WO    2011/105013 A1    9/2011

OTHER PUBLICATIONS

U.S. Appl. No. 14/169,931, filed Jan. 31, 2014, entitled "Relaying Device, Image Processing Device, and System Comprising Image Processing Device and Relaying Device", first named inventor: Masayuki Ishibashi.

Notice of Allowance dated Jan. 20, 2015 received in related U.S. Appl. No. 141169,931.

Extended European Search Report dated Feb. 19, 2015 from related European Application No. 14 15 3534.4.

Extended European Search Report dated Feb. 19, 2015 from related European Application No. 14 15 3535.1.

* cited by examiner

RELAYING DEVICE, IMAGE PROCESSING DEVICE, AND SYSTEM COMPRISING IMAGE PROCESSING DEVICE AND RELAYING DEVICE

CROSS-REFERENCE TO RELATED APPLICATION

This application claims priority to Japanese Patent Application No. 2013-074506, filed on Mar. 29, 2013, the contents of which are hereby incorporated by reference into the present application.

TECHNICAL FIELD

The present specification discloses a relaying device connected with an image processing device and a server via a network.

DESCRIPTION OF RELATED ART

A known image processing device has a web browser integrated therein, and has a function for downloading and printing a web page. Further, the image processing device has a function for sending scan data, which was created by scanning a document which has a Joint Photographic Experts Group (referred to as JPEG) format, to a web server without performing any processing.

SUMMARY

It may not be preferred to upload image data, which was created by the image processing device scanning a document, to the server without performing any processing.

In one aspect of the teachings disclosed herein, a relaying device may be provided. The relaying device may comprise a network interface configured to connect with a network, a processor coupled to the network interface; and a memory storing instructions. The instructions, when executed by the processor, may cause the relaying device to perform receiving via the network interface, from a image processing device which is connected with the network, process identification information. The instructions may cause the relaying device to perform identifying a data process as a selected data process in accordance with the process identification information, the selected data process being at least one data process selected from among a plurality of data processes in the image processing device. The plurality of data processes may be executed on output data outputted from the image processing device or the server. The instructions may cause the relaying device to perform identifying an instruction-module as a selected instruction-module from among a plurality of instruction-modules in accordance with the selected data process. The selected instruction-module may be capable of executing the selected data process. The instructions may cause the relaying device to perform executing the selected instruction-module so as to execute the selected data process on the output data. The instructions may cause the relaying device to perform transmitting processed data to a server which is connected with the network in a case that the output data is outputted from the image processing device. The processed data may be data created by the selected instruction-module executing the selected data process on the output data. The instructions may cause the relaying device to perform transmitting the processed data to the image processing device in a case that the output data is outputted from the server.

EMBODIMENT (System Configuration)

Figure 1:
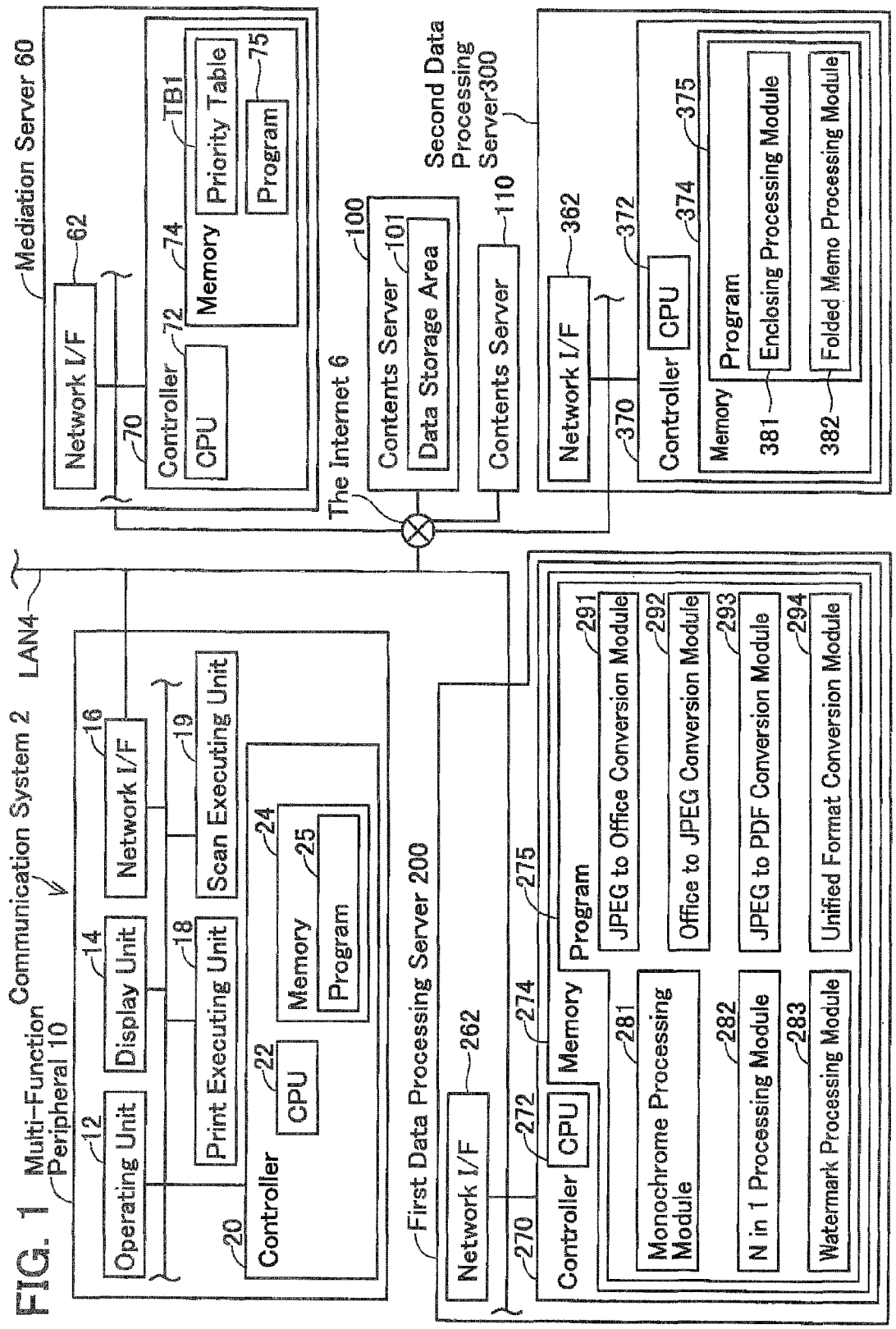
FIG. 1 shows the configuration of a communication system.

As shown in FIG. 1, a communication system 2 includes a multi-function peripheral 10, a mediation server 60, contents servers 100 and 110, a first data processing server 200, and a second data processing server 300. The multi-function peripheral 10 is connected with a LAN 4. The mediation server 60, the contents servers 100 and 110, the first data processing server 200, and the second data processing server 300 are connected with the Internet 6.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The multi-function peripheral 10 is capable of communicating with the mediation server 60, the first data processing server 200, etc. via the network I/F 16. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24. The memory 24 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

(Structure of Mediation Server 60)

The mediation server 60 is a server independent of the first data processing server 200, the second data processing server 300 and the contents servers 100 and 110. The mediation server 60 is a server for mediating communication of various data between the first data processing server 200, the second data processing server 300 and the contents servers 100 and 110 respectively, and the multi-function peripheral 10. The mediation server 60 is a server provided by a vendor or a manufacturer of the multi-function peripheral 10. The mediation server 60 includes a network I/F 62 and a controller 70. The mediation server 60 is capable of communicating with the multi-function peripheral 10, the contents servers 100 and 110, the first data processing server 200, the second data processing server 300, etc. via the network I/F 62. The controller 70 comprises a CPU 72 and a memory 74. A program 75 and a priority table TB1 are stored in the memory 74. The CPU 72 executes various processes in accordance with the program 75. As with the memory 24, the memory 74 may be a computer readable storage medium.

Figure 11:
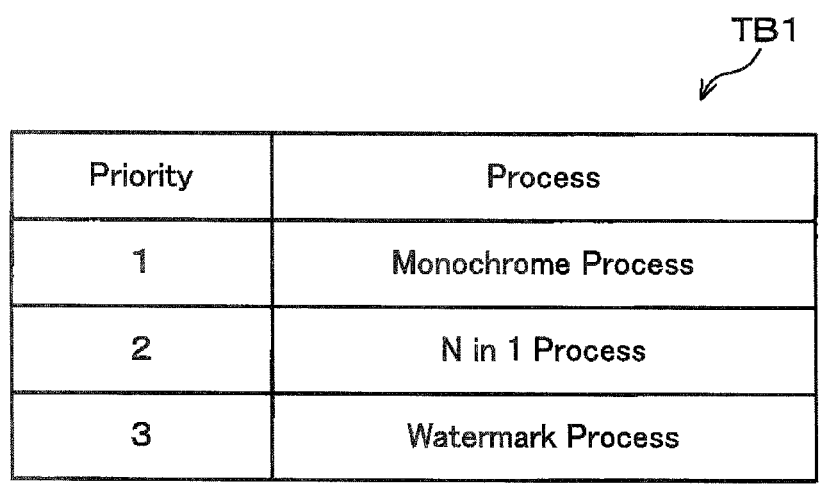
FIG. 11 shows an example of a priority table.

The priority table TB1 is a table showing the priority of a plurality of processes. FIG. 11 shows an example of the priority table TB1. In the priority table TB1, a monochrome process, an N in 1 process, and a watermark process are associated respectively with a first to third ranking of priority. The priority may be determined so as to give higher priority to processes which more greatly reduce a data amount in the process. Thereby, the next process can be executed in a state having a reduced amount of data, thus allowing reduction of a processing load in the next process. For example, monochrome image data has a smaller amount of data than color image data. Therefore, in case of executing the N in 1 process after the monochrome process has been executed, the data to be handled can be compressed when executing the N in 1 process, allowing the processing load of the N in 1 process to be reduced. Further, rather than execute the watermark processing for each N pages of image data and then execute the N in 1 process, the watermark process can be executed a lesser number of times when the N in 1 process is first executed and then the watermark process is executed, allowing the processing load to be reduced. Moreover, priority of the plurality of processes may be determined for reasons other than reducing the processing load of the processes.

(Structure of the First Data Processing Server 200)

The first data processing server 200 is a server configured as a separate entity from the mediation server 60, the contents servers 100 and 110 and the second data processing server 300. The first data processing server 200 executes conversion processing, described below, of data of various types. The first data processing server 200 may be a server which is provided to a vendor of the multi-function peripheral 10. The first data processing server 200 comprises a network interface 262 and a controller 270. The controller 270 comprises a CPU 272 and memory 274. The memory 274 stores a program 275. The CPU 272 executes various processing according to the program 275. As with the memory 24, the memory 274 may be a computer readable storage medium.

The program 275 includes a monochrome processing module 281, an N in 1 processing module 282, and a watermark processing module 283 as programs which execute the processes for changing data content. The monochrome processing module 281 is a program for processing color image data into monochrome image data. The N in 1 processing module 282 is a program for condensing image data for each of N pages and executing processing assigned to the image data of one page. The watermark processing module 283 is a program for executing processing to imprint a small design or character string on the image data. The monochrome processing module 281, the N in 1 processing module 282, and the watermark processing module 283 all execute processing on the image data having JPEG format, and provide an output as JPEG format, processed image data. Further, the monochrome processing module 281, the N in 1 processing module 282, and the watermark processing module 283 may be described as basic processing modules.

Further, the program 275 includes, as programs for executing a format conversion process to convert data format, a JPEG to Office conversion module 291, an Office to JPEG conversion module 292, a JPEG to PDF conversion module 293, and a unified format conversion module 294. The JPEG to Office conversion module 291 is a program for converting format of data from JPEG format to Office format. Examples of data in Office format are data in word processor format, data in spreadsheet format, data in presentation software format, etc. The Office to JPEG conversion module 292 is a program for converting format of data from Office format to JPEG format. The JPEG to PDF conversion module 293 is a program for converting format of data from JPEG format to Portable Document Format (referred to as PDF) format.

The JPEG to Office conversion module 291 is also a program used when executing "Office conversion upload" of basic functions (to be described). The Office to JPEG conversion module 292 is also a program for executing "Office print" of the basic functions (to be described). The JPEG to PDF conversion module 293 is also a program for executing "PDF conversion upload" of the basic functions (to be described). In addition, a PDF to JPEG conversion module may be provided. This may be a program for executing a "PDF print" among basic functions (to be described), and is a program for converting the format from PDF format to JPEG format. The unified format conversion module 294 is a module for converting data having a format that cannot be processed by the processing modules into data having a format that can be processed by the processing modules. For example, in case any of the monochrome processing module 281, the N in 1 processing module 282, the watermark processing module 283, an enclosing processing module 381 (to be described), or a folded memo processing module 382 (to be described) is capable of processing the JPEG format data, the unified format conversion module 294 may be a module which converts data in bitmap format, Graphics Interchange Format (referred to as GIF), etc. into the JPEG format. Each processing module may of course be capable of processing data in unified format, which is other than the JPEG format.

(Structure of the Second Data Processing Server 300)

The second data processing server 300 is a server configured as a separate entity from the mediation server 60, the contents servers 100 and 110 and the first data processing server 200. The second data processing server 300 executes conversion processing, described below, of data of various types. The second data processing server 300 comprises a network interface 362 and a controller 370. The controller 370 comprises a CPU 372 and memory 374. The memory 374 stores a program 375. As with the memory 24, the memory 374 may be a computer readable storage medium.

The program 375 includes the enclosing processing module 381 and the folded memo processing module 382 as programs that execute processes for changing content of the data. The enclosing processing module 381 is an application for executing an "enclosing scan" and an "enclosing copy" (to be described) from among application functions, and is a program for executing a trimming process in which an image within a selected range indicated by a marker or the like written on a document is extracted, or a selective erasure process in which an image within a selected range is erased. The folded memo processing module 382 is an application for executing a "folded memo scan" (to be described) from among the application functions. Both the enclosing processing module 381 and the folded memo processing module 382 process image data that has JPEG format, and provide output as JPEG format, processed image data. Further, the enclosing processing module 381 and the folded memo processing module 382 may be described as application processing modules.

Some features relating to the description in the present specification are hereby explained. In the present specification, the description "the CPU 72 of the mediation server 60 receives various information" includes the technical meaning "the CPU 72 of the mediation server 60 receives various information via the network interface 62". Further, the description "the CPU 72 of the mediation server 60 sends various information" includes the technical meaning "the CPU 72 of the mediation server 60 outputs various information via the network interface 62". Similar features exist regarding the CPU 272 of the first data processing server 200 and the network interface 262. Similar features exist regarding the CPU 22 of the multi-function peripheral 10 and the network interface 16.

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data".

In the present specification, a case is explained in which the mediation server 60 and first data processing server 200 are connected by the Internet 6 (that is, when a device functioning as the mediation server 60 and a device functioning as the first data processing server 200 are disposed at physically distant positions), but other configurations are possible. The mediation server 60 and first data processing server 200 may be realized as a single server. In this case, in the single server, a program which functions as the mediation server 60 and a program which functions as the first data processing server 200 run, and communication between the programs is performed via a bus in the server. When the mediation server 60 and first data processing server 200 are realized as a single server, in the present specification, communication which is explained as communication between the mediation server 60 and the first data processing server 200 may be taken to mean communication between the program which functions as the mediation server 60 and the program which functions as the first data processing server 200. Further, a configuration may be realized in which a program which functions as the mediation server 60, and moreover also functions as the first data processing server 200, runs on a single server. In this case, in the present specification, communication which is explained as communication between the mediation server 60 and the first data processing server 200 may replaced with passing of data within the program which functions as the mediation server 60 and which moreover functions as the first data processing server 200.

(Structure of Contents Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark of Evernote Corporation)", "Google (registered trademark of Google, Inc.) Docs", "PICASA (registered trademark of Google, Inc.), "FACEBOOK (registered trademark of Facebook, Inc.)", etc. A user of the online service can upload or download various data to or from a storage area assigned to the user via the Internet 6. The contents server 100 comprises a data storage area 101. The data storage area 101 is an area storing various data. The various data stored in the data storage area 101 may be described as contents data.

(Operation of Communication System)

Figure 12:
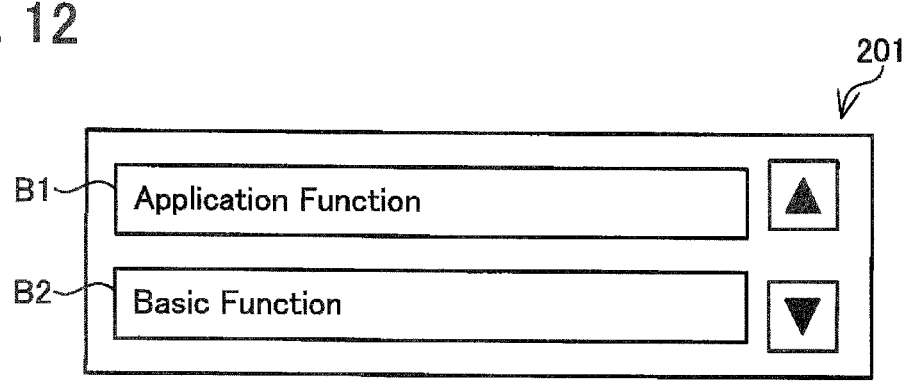
FIG. 12 shows an example of a main screen display.

Operation of the communication system 2 will be described using sequence diagrams of FIGS. 2 to 9. In receiving a command for displaying a main screen, the CPU 22 of the multi-function peripheral 10 cause the display unit 14 to display the main screen in S510. The command for displaying the main screen may be input from the operating unit 12 by a user. Data for displaying the main screen may be preliminarily stored in the memory 24. An example of the main screen 201 is shown in FIG. 12. The main screen 201 includes button images B1 and B2. The button images B1 and B2 are images for receiving an input of an execution order among a plurality of functions. A function received by the button image B1 is an application function. The application function is a function that executes applied processing, such as the enclosing process, folded memo process, etc. A function received by the button image B2 is a basic function. The basic function is a function that executes a basic process, such as uploading scan data from the multi-function peripheral 10 to a contents server, printing data that was downloaded from the contents server to the multi-function peripheral 10, etc.

When an operation of selecting the button image B1 or B2 is executed in the multi-function peripheral 10, in S512 the CPU 22 sends function identification information to the mediation server 60. The function identification information is information indicating a function associated with the selected button image. An example of the function identification information is "application function", which is the name of the button image B1. That is, the function identification information may be information indicating the selected button. Moreover, the function identification information may include device format information corresponding to the format of the scan data outputted by the multi-function peripheral 10. An example of the device format information may be model information of the multi-function peripheral 10. In this case, based on the model information of the multi-function peripheral 10, the CPU 72 of the mediation server 60 may identify the format of the scan data that is outputted by that model. In case there is a plurality of formats in which the multi-function peripheral 10 can generate scan data, the device format information may be information indicating a default format which, from the plurality of formats, is the format that is mainly used. The default format may be JPEG. Moreover, in executing a process to realize an application function (to be described), the multi-function peripheral 10 may generate scan data having the default format.

In receiving button image identification information from the multi-function peripheral 10, in S514 the CPU 72 of the mediation server 60 determines a function indicated by the function identification information. In case the basic function is indicated (S514: basic function), the process proceeds to S929. In case the application function is indicated (S514: application function), the process proceeds to S518. In S518, the CPU 72 specifies an application selection screen 211 as the screen data to be sent next to the multi-function peripheral 10. The application selection screen 211 is a screen for receiving selection of one or more applications among the plurality of the application functions.

In S518, the CPU 72 of the mediation server 60 generates application selection screen data for causing the application selection screen 211 to be displayed. Information (not shown) indicating which type of information should be included in the application selection screen data is stored in the memory 74. The CPU 72 of the mediation server 60 generates the application selection screen data according to this information. The following is included in the application selection screen data: information indicating that button images B11 to B13 are included in the application selection screen 211; information indicating that a screen for selecting one of the button images B11 to B13 is displayed; information indicating that "enclosing scan", "folded memo scan", "enclosing copy" correspond respectively to the respective button images B11 to B13; and information indicating a character string to be attached to the button images B11 to B13 and displayed. In S519, the CPU 72 of the mediation server 60 sends the application selection screen data to the multi-function peripheral 10.

Figure 13:
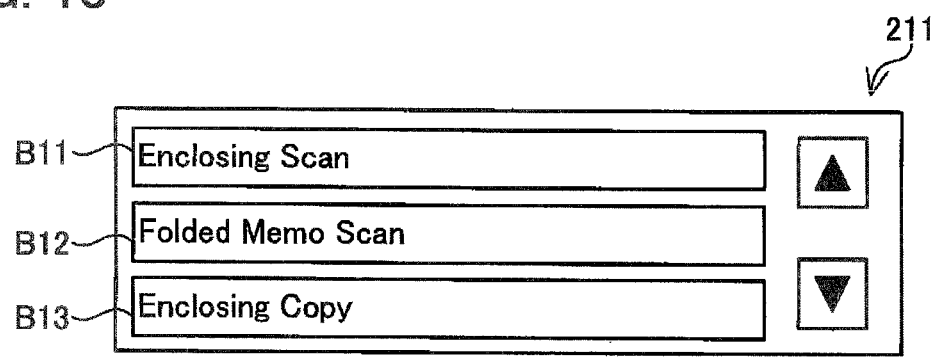
FIG. 13 shows an example of an application selection screen display.

In receiving the application selection screen data from the mediation server 60, in S521 the CPU 22 of the multi-function peripheral 10 causes the application selection screen 211 to be displayed on the display unit 14. As shown in FIG. 13, the application selection screen 211 includes the button images B11 to B13.

The button image B11 is an image for receiving selection of the application function "enclosing scan". "Enclosing scan" is an application for executing image processing on scan data generated by the multi-function peripheral 10 scanning a document, identifying a marker specifying a selected range written on the document, executing various processes on the image within the selected range, and uploading the processed data to the contents server. In "enclosing scan", the image within the selected range may be trimmed, or the image within the selected range may be deleted.

The button image B12 is an image for receiving selection of the application function "folded memo scan". "Folded memo scan" is an application for uploading processed data to the contents server after having executed a page identification process on the scan data output from the multi-function peripheral 10. Specifically, in "folded memo scan", a boundary line of a page uses printed, dedicated printing paper. By folding the printing paper at the boundary line of the page, one sheet of paper functions as a memo book having a plurality of pages of memo areas. After writing on the memo book, the folds are unfolded to return to the state of one sheet of printing paper, and scanning is executed in which, by identifying the boundary line of the page, each page can be scanned. For example, in case one sheet of paper was folded into four, a front surface and a back surface together have a memo area of eight pages. When the folds are unfolded after writing and "folded memo scan" is executed, the eight pages of image data having page numbers appended thereto can be generated. Moreover, the multi-function peripheral 10 may download and print the dedicated printing paper from a server.

The button image B13 is an image for receiving selection of the application function "enclosing copy". "Enclosing copy" is an application for executing image processing on scan data generated by the multi-function peripheral 10 scanning a document, identifying a marker specifying a selected range written on the document, executing various processes on the image within the selected range, and again downloading the processed data to the multi-function peripheral 10 and executing a print. In "enclosing copy", the image within the selected range may be trimmed, or the image within the selected range may be deleted.

Moreover, based on the application selection screen data received from the mediation server 60, the CPU 22 of the multi-function peripheral 10 creates bitmap information, etc. for displaying the images of the button images B11 to B13, and causes the application selection screen 211 to be displayed on the display unit 14. Thus, since the bitmap information is created at the multi-function peripheral 10 side, the bitmap information for displaying the image of the button images B11 to B13 does not need to be included in server selection screen data. Further, bitmap information for displaying up and down arrow buttons shown in FIG. 13 do not need to be included either. By operating the operating unit 12, the user selects the button image representing a desired application from the application selection screen 211.

When the operation of selecting the button image in the multi-function peripheral 10 is performed, in S531 the CPU 22 of the multi-function peripheral 10 sends application identification information to the mediation server 60. The application identification information is information for identifying the selected application function. An example of the application identification information is the name of the application function. That is, the application identification information may be information indicating the selected button.

Figure 14:
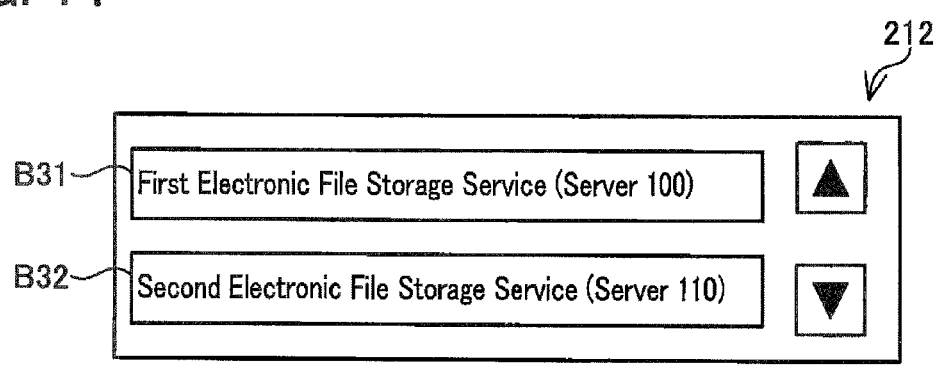
FIG. 14 shows an example of a server selection screen display.

In receiving the application identification information from the multi-function peripheral 10, in S532 the CPU 72 of the mediation server 60 determines whether the application function indicated by the application identification information is an application function that requires selection of a service server. In case of a negative determination (S532: NO), the process proceeds to S538. In case of a positive determination (S532: YES), the process proceeds to S533. Moreover, in S532 the CPU 72 executes positive determination in case the application function indicated by the application identification information is "enclosing scan" or "folded memo scan", and executes negative determination in case the application function indicated by the application identification information is "enclosing copy". In S533, the CPU 72 of the mediation server 60 generates service selection screen data for causing a service selection screen 212 to be displayed. In S535, the CPU 72 sends the service selection screen data to the multi-function peripheral 10. In receiving the service selection screen data from the mediation server 60, in S536 the CPU 22 of the multi-function peripheral 10 causes the service selection screen 212 to be displayed on the display unit 14. Thereby, the CPU 22 receives the selection of service. As shown in FIG. 14, the service selection screen 212 includes button images B31 and B32.

By operating the operating unit 12, the user selects a button image, from the service selection screen 212, representing a contents server which is to upload the data. In the present embodiment, the description will continue using, as an example, a case that the user selects the button image B31 (i.e., the contents server 100). Notably, the concept of "selecting a server" may include a concept of "selecting a service". Specifically, selecting the contents server 100 may be equivalent to selecting a service that the contents server 100 provides. Further, in a case that a plurality of servers for providing one service is present, the concept of "selecting a server" may include the concept of selecting at least one of the plurality of servers. In S537, the CPU 22 sends service identification information corresponding to the button image selected by the user to the mediation server. In the illustrative example of the present embodiment, service identification information including a server name "Server 100" is sent to the mediation server. That is, the service identification information may be information indicating the selected button.

Figure 16:
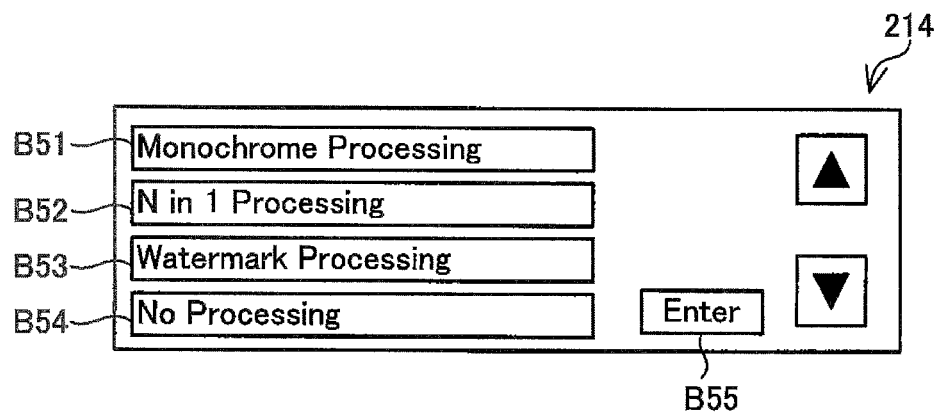
FIG. 16 shows an example of a process selection screen display.

In S538, the CPU 72 of the mediation server 60 determines whether an application function has been selected in which a process can be selected. In case of a negative determination (S538: NO), the process continues to S559. In case of a positive determination (S538: YES), the process continues to S539. Moreover, in S538 the CPU 72 executes the positive determination in case the application function indicated by the application identification information is "enclosing scan" or "enclosing copy", and executes the negative determination in case the application function indicated by the application identification information is "folded memo scan". In S539, the CPU 72 of the mediation server 60 generates process selection screen data for causing a process selection screen 214 to be displayed. In S541, the CPU 72 of the mediation server 60 sends the process selection screen data to the multi-function peripheral 10. In S543, the CPU 22 of the multi-function peripheral 10 causes the process selection screen 214 to be displayed on the display unit 14. As shown in FIG. 16, the process selection screen 214 includes button images B51 to B55.

The button image B51 is an image for receiving a selection of "monochrome processing". The button image B52 is an image for receiving a selection of "N in 1 processing". The button image B53 is an image for receiving a selection of "watermark processing". The button image B54 is an image for receiving a selection of not executing a process. By operating the operating unit 12, the user selects a button image representing the desired process from the process selection screen 214. Moreover, a plurality of processes can also be selected. For example, a plurality of processes may be selected by touching a plurality of button images representing processes that one wishes to execute, and then finally touching the button image B55 indicating "enter".

Figure 10:
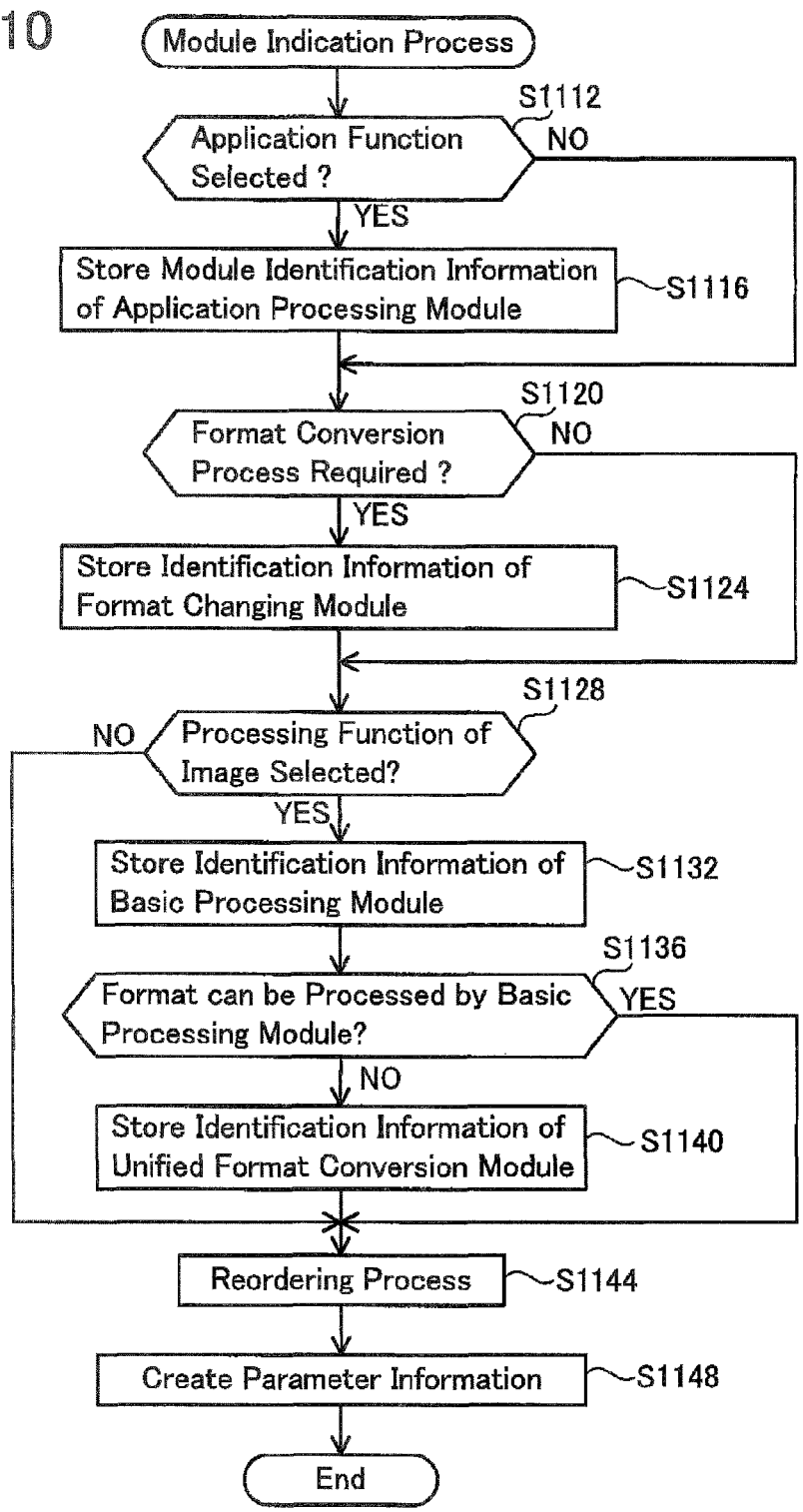
FIG. 10 shows a flow diagram of a module indication process.

In S544 the CPU 22 sends process identification information that indicates the selected process to the mediation server 60. In S559, the CPU 72 of the mediation server 60 executes a module indication process. The module indication process is a process specifying an execution target module, this being a module for executing a process. Module identification information, this identifying the specified execution target module, is stored in a First In First Out (referred to as FIFO) memory area (not shown). In case a plurality of execution target modules is specified, identification information of the plurality of execution target modules is stored in the FIFO memory area in the order specified. Contents of the module indication process will be described using the flowchart of FIG. 10. Moreover, the flowchart of FIG. 10 is also a flowchart for a case that the function identification information indicates "application function", and a case that the function identification information indicates "basic function".

In S1112, the CPU 72 determines whether an application function has been selected. This determination may be executed based on the function identification information received in S531. A case that the function identification information received in S531 indicates "enclosing scan" can be given as an example where the application function has been selected. In case of a negative determination (S1112: NO), the process continues to S1120, and in case of a positive determination (S1112: YES), the process continues to S1116. In S1116, the CPU 72 temporarily stores the module identification information identifying the application processing module for executing the process relating to the selected application function. For example, in case "enclosing scan" has been selected, the CPU 72 temporarily stores identification information of the enclosing processing module 381. Then, process proceeds to S1120.

In S1120, the CPU 72 determines whether a format conversion process of the image data is required in the basic function. The determination may be negative in case one of the application functions has been selected. In case the basic function identification information indicates "scan upload" and setting format information is included in scan setting information received in S958, a positive determination may be made in case a format indicated in the setting format information and a format indicated in output format identification information received in S949 are identical, and a negative determination may be made in case the said formats are not identical. Further, in case the basic function identification information indicates "scan upload" and the setting format information is not included in the scan setting information received in S958, or in case the scan setting information has not been received, the positive determination may be made in case device format information received in S512 or S941 and the output format identification information received in S949 are not identical, and the negative determination may be made in case the said formats are identical. Moreover, in case the basic function identification information indicates "scan upload", and the output format identification information indicates Office format, it means that "Office conversion upload" among the basic functions has been selected. In case the basic function identification information indicates "scan upload", and the output format identification information indicates PDF format, it means that "PDF conversion upload" among the basic functions has been selected. In case the basic function identification information indicates "download print", and a format of selection data received in S81 is Office format, it means that "Office print" among the basic functions has been selected. In case the basic function identification information indicates "download print", and the format of the selection data received in S81 is PDF format, it means that "PDF print" among the basic functions has been selected.

In case of the negative determination in S1120 (S1120: NO), the process continues to S1128, and in case of the positive determination in S1120 (S1120: YES), the process continues to S1124. In S1124, the CPU 72 temporarily stores identification information of a format changing module corresponding to the function that has been selected. Then, process proceeds to S1128.

In S1128, the CPU 72 determines whether a processing function for the image has been selected. This determination may be executed based on the process identification information received in S544. A case that the process identification information received in S544 indicates "monochrome processing" and "N in 1 processing" can be given as an example where the processing function for the image has been selected. In case of negative determination (S1128: NO), the process proceeds to S1144, and in case of positive determination (S1128: YES), the process proceeds to S1132. In S1132, the CPU 72 temporarily stores the module identification information of the basic processing module that executes the processing indicated in the process identification information. For example, in case the process identification information indicates "monochrome processing" and "N in 1 processing", the CPU 72 temporarily stores identification information of the monochrome processing module 281 and identification information of the N in 1 processing module 282. Then, process proceeds to S1136.

In S1136, the CPU 72 determines whether data of the processing source has a format that can be processed by the basic processing module. Specifically, the CPU 72 may make the positive determination in case the application function has been selected. This is because the application processing module outputs JPEG format data, and the basic processing module processes JPEG format data. Further, the CPU 72 may make the positive determination in case a basic function has been selected, and "Office download print" and "PDF download print" among the basic functions have been selected. This is because the Office to JPEG conversion module, and the PDF to JPEG conversion module output JPEG format data, and the basic processing module processes JPEG format data. Further, in case "Office conversion upload" and "PDF conversion upload" among the basic functions have been selected, the CPU 72 may execute determination based on the device format information included in the function identification information received in S517 or S941, or based on the setting format information included in the scan setting information received in S958. In this case, a negative determination is made in case the device format information or the setting format information indicates JPEG format, and a positive determination is made in case the said information does not indicate JPEG format. In case "download print" among the basic functions has been selected, the determination may be executed based on an extension of selection data included in data detail information received in S55. In this case, a negative determination is made in case the extension indicates JPEG format, and a positive determination is made in case the extension does not indicate JPEG format.

In case of the positive determination in S1136 (S1136: YES), the process continues to S1144, and in case of the negative determination in S1136 (S1136: NO), the process continues to S1140. Moreover, the selected application function and the selected basic function may be determined based on the module identification information that is stored temporarily, or may be determined based on the function identification information, the application identification information, and the output format identification information.

In S1140, the CPU 72 temporarily stores identification information of the unified format conversion module. Specifically, in case the basic function has been selected, and "Office download print" and "PDF download print" among the basic functions have been selected, the respective module identification information of the format conversion module is stored as the module identification information of the unified format conversion module. And in case "download print" among the basic functions has been selected and the extension of the selection data included in the data detail information received in S55 indicates a format other than the JPEG format, the CPU 72 may temporarily store the module identification information of the unified format conversion module 294 which converts data having the format indicated in the extension into the JPEG format data.

In S1144, the CPU 72 executes a reordering process in which order of execution of the modules that have been temporarily stored is rearranged. Specifically, first, the execution target module having the highest priority is determined. In case an application function has been selected, the corresponding application processing module is the execution target module with the highest priority. In case "download print" among the basic functions has been selected and the module identification information of the format conversion module has been stored temporarily in S1140, the format conversion module is the execution target module with the highest priority. In case "scan upload" among the basic functions has been selected and the module identification information of the basic processing module has been stored temporarily in S1132, the basic processing module is the execution target module with the highest priority. In case the application processing module or the format conversion module is the execution target module with the highest priority, and the module identification information of the basic processing module is not stored temporarily, the CPU 72 stores only the module identification information of the application processing module or the format conversion module in the FIFO memory area. In case the application processing module or the format conversion module is the execution target module with the highest priority and the module identification information of the basic processing module has been stored temporarily in S1132, the basic processing module is the execution target module that is second or later in priority. Moreover, in case the module identification information of a plurality of the basic processing modules has been stored in S1132, the execution order of the basic processing modules is determined so as to follow the priority stored in the priority table TB1. After the execution target module that is second or later in priority has been determined, in case "scan upload" among the basic functions has been selected and the module identification information of the format conversion module has been stored temporarily in S1140, this format conversion module becomes the execution target module that is ranked last. After the execution target modules have been ranked in priority from highest to last ranking, in S1144 the CPU 72 stores the module identification information of the plurality of execution target modules in the FIFO memory area in the order of priority. Then, process proceeds to S1148.

In S1148, the CPU 72 creates parameter information. The parameter information is information including a module identifier of the execution target modules, and is also information indicating the execution sequence of the execution target modules. Thus, the module indication process ends, and the process proceeds to S561 (see FIG. 3).

In S561, the CPU 72 of the mediation server 60 generates scan upload execution command information. The scan upload execution command information is information commanding the multi-function peripheral 10 to execute uploading of upload data generated by a scan process. In S563, the CPU 72 sends the scan upload execution command information to the multi-function peripheral 10. In S565, the CPU 22 of the multi-function peripheral 10 executes a scan of an image. Specifically, the user sets a paper, on which a prescribed image has been recorded, on the scan executing unit 19, and presses a start reading button of the operating unit 12, whereupon the CPU 22 uses the scan executing unit 19 to read the image recorded on the paper, and creates the upload data from the image data that was read. Moreover, in case "enclosing scan" and "enclosing copy" have been selected, a document which has been written on with a marker is scanned, and in case of "folded memo scan", a document on which a memo has been written using dedicated folded memo paper is scanned.

In S571, the CPU 22 sends data processing upload destination Uniform Resource Locator (referred to as URL) reception request information and template reception request information to the mediation server 60. The "data processing upload" is a process for uploading various data, for data processing, to the first data processing server 200 or the second data processing server 300. The data processing upload destination URL reception request information is information for requesting a data processing upload destination URL, this being information needed for uploading to the first data processing server 200. The template reception request information is information for requesting a template of an upload message (to be described).

First data processing P1 (S572 to S651) is a process for causing the first data processing server 200 or the second data processing server 300 to execute data processing of scan data generated by the multi-function peripheral 10, or of data received by the mediation server 60 from the contents server 100. In S572, the CPU 72 of the mediation server 60 determines whether data that is to undergo data processing by the data processing server is scan data generated by the multi-function peripheral 10. Specifically, based on the application identification information, a positive determination may be made in case an application function has been selected. Based on the basic function identification information, the positive determination may be made in case "scan upload", "Office conversion upload", or "PDF conversion upload" has been selected as the basic function. A negative determination may be made in case "download print", "Office print", or "PDF print" has been selected as the basic function. In case of the negative determination (S572: NO), the process proceeds to S53, and in case of the positive determination (S572: YES), the process proceeds to S573.

In S573, the CPU 72 of the mediation server 60 sends data ID for data processing upload reception request information to the data processing server which executes the first data processing P1. Specifically, the CPU 72 of the mediation server 60 sends the data ID for data processing upload reception request information to the data processing server which comprises a module indicated by the module identification information stored at the beginning of the FIFO memory. Moreover, as will be described in detail later, the CPU 72 removes the module identification information of the module which has undergone data processing from the beginning of the FIFO memory. Thus, the module identification information with the highest priority among the modules which have not yet undergone data processing is stored at the beginning of the FIFO memory. The data ID for data processing upload reception request information is information for requesting, from the data processing server, the data ID for data processing upload, this being for identifying the upload data uploaded to the data processing server. In S575, the CPU 272 of the first data processing server 200, or the CPU 372 of the second data processing server 300 sends the data ID for data processing upload to the mediation server 60.

Moreover, the processes S573 and S575 may be executed by communicating with either the first data processing server 200 or the second data processing server 300. Below, in case a process that can be performed for either the first data processing server 200 or the second data processing server 300 is described in the sequence diagrams, the one is described using a solid arrow, and the other is described using a dotted arrow.

In S577, the CPU 72 creates a template for an upload message. A template for an upload message is a template for a message when uploading upload data to the data processing server.

In S579, the CPU 72 sends a data processing upload destination URL and upload message template to the multi-function peripheral 10. An example of the data processing upload destination URL is the URL of the data processing server.

In S581, the CPU 22 creates an upload message based on the received template, the received data processing upload destination URL, and the upload data created in S565. Specifically, the multi-function peripheral 10 stores binary data as the upload data, the data processing upload destination URL, the data size of the upload data, and various other information at prescribed positions in the template received from the mediation server 60. By this means, an upload message suitable for the data processing server can be created.

In S583, the CPU 22 sends the upload message to the data processing server. In S585, the CPU of the data processing server sends data processing upload result information to the multi-function peripheral 10. The data processing upload result information is information indicating whether the upload data was normally uploaded to the data processing server. Moreover, the processes S583 and S585 may be executed by communicating with either the first data processing server 200 or the second data processing server 300. In S587, the CPU 22 of the multi-function peripheral 10 transfers the received data processing upload result information to the mediation server 60.

In S589, the CPU 72 of the mediation server 60 decodes the data processing upload result information and creates a decoding result. The data processing upload result information is information sent from the data processing server to the multi-function peripheral 10, and thus has specifications particular to the data processing server. Hence by using a decoding program, not shown, included in the program 75 stored by the mediation server 60, the data processing upload result information can be decoded. A decoding result is a message in a format decodable by the multi-function peripheral 10. The decoding result includes a data processing upload result included in the decoded data processing upload result information.

In S619 to S651, a data processing execution process is executed. In S619, the CPU 72 sends first data processing request information to the data processing server. The first data processing request information is information for requesting execution of data processing on upload data identified by the data ID for data processing upload received in S575 (i.e., the upload data uploaded to the data processing server in S583). The data processing is a process including the process and format changing process described above. Moreover, in case module identification information of a module provided in the same data processing server is being stored in the FIFO memory sequentially from the module identification information stored at the beginning of the FIFO memory, the CPU 72 includes, in the first data processing request information, information requesting execution of the plurality of processes in the order in which they are stored in the FIFO memory.

In S621, the CPU 272 of the data processing server sends processed data reception information to the mediation server 60. The processed data reception information is information for identifying data processing executed according to the processing to request execution of data processing (S619), and may include a data processing job ID. The processed data reception information may be described using a URL description method. Moreover, in case the CPU 72 includes information requesting execution of the plurality of processes in the first data processing request information in S619, one processed data reception information identifies all the plurality of data processes.

The processes S631 to S651 are processes which, when data processing for uploading data is started, cause the multi-function peripheral 10 to wait until the completion of the aforementioned data processing for the uploading. The data processing server executes the data processing on the upload data in response to the first data processing request information received in S619. The data processing may be executed on each of upload data divided into prescribed data amounts (e.g., 100 KB). Further, the prescribed data amount may be a data amount suitable for data processing. For example, in case "JPEG to Office conversion process" and "JPEG to PDF conversion process" are included, the conversion process may be executed 100K bytes at a time. When "JPEG to Office conversion process" and "JPEG to PDF conversion process" are not included, and only "enclosing process", "folded memo process", "monochrome process", "N in 1 process" and "watermark process" are included, the process may be executed on all the upload data.

In S631, the CPU 72 of the mediation server 60 sends data processing completion confirmation request information to the data processing server. The data processing completion confirmation request information is information for confirming with the data processing server whether the data processing requested from the data processing server in S619 has been completed. In order to identify the data processing, the CPU 72 includes, in the data processing completion confirmation request information, the processed data reception information sent by the data processing server in S621.

In S632, the CPU of the data processing server determines whether the data processing has been completed. Specifically, the data processing that is to be performed on the processed data reception information included in the data processing completion confirmation request information is specified to be the data processing for determining whether the data processing can be completed. Then, it is determined whether the conversion of a prescribed data amount from a beginning part of the upload data has been completed in the specified data processing. Specifically, in regards to the data processing executed for 100K bytes at a time, it is determined whether this processing of 100K bytes has been completed; and similarly, in regards to the data processing that processes all the upload data, it is determined whether the data processing for all the upload data has been completed. In case the data processing has not been completed (S632: NO), the process proceeds to S633.

In S633, the CPU sends to the mediation server 60 data processing incomplete notification information indicating that conversion processing has not completed. In S635, the CPU 72 of the mediation server 60 generates a wait command in response to the reception of the data processing incomplete notification information. The wait command is a command to cause the multi-function peripheral 10 to wait for the completion of the conversion processing.

In S637, the CPU 72 sends the wait command to the multi-function peripheral 10. In S639, the CPU 22 of the multi-function peripheral 10 executes wait processing to wait for the completion of the data processing. The wait processing may for example be processing in which a timer which had been started to detect a timeout of the data processing is reset and again started. Or, for example, the wait processing may be processing in which the time until timeout of data processing is lengthened by increasing the timeout time stored in memory 24 such that the time until timeout of data processing is extended.

In S641, the CPU 22 sends to the mediation server 60 the wait processing completion information indicating that wait processing execution has completed. Then the process returns to S631.

However, when in S632 it is determined that the data processing has completed (S632: YES), the process proceeds to S651. In S651, the CPU of the data processing server sends to the mediation server 60 the data processing completion notification information indicating that the data processing of a prescribed data amount in the leading portion of the upload data has completed. Moreover, the data processing execution process (S619 to S651) may be performed by communicating with the second data processing server 300.

In S654, the CPU 72 of the mediation server 60 that has received the data processing completion notification information deletes, from the beginning of the FIFO memory, the module identification information corresponding to the data processing in which the data processing of the prescribed data amount has been completed. In case the CPU 72 included information requesting execution of the plurality of processes in the first data processing request information in S619, module identification information corresponding to the plurality of processes is removed from the beginning of the FIFO memory.

In S659, the CPU 72 of the mediation server 60 determines whether module identification information is being stored in the FIFO memory. In case of a negative determination (S659: NO), the process continues to S752 in order to execute a process of outputting the processed data which has undergone data processing by all the modules stored in the FIFO memory, and in case of a positive determination (S659: YES), the process continues to S663 in order to execute new data processing.

In S663, the CPU 72 of the mediation server 60 sends first processed data reception command information to the data processing server which has been executing data processing until now. The first processed data reception command information is a command causing the processed data identified in the processed data reception information to be sent to the mediation server 60 from the data processing server which has been executing data processing until now.

In S665, the CPU of the data processing server, which has been executing data processing until now, sends the processed data specified by the first processed data reception command information to the mediation server 60. In the data processing server, in case the data processing for the upload data has been executed for 100 KB at a time, in S665 the processed data may be sent 100 KB at a time to the mediation server 60 in response to the first processed data reception command information received in S663. In this case, the CPU 72 of the mediation server 60 may repeat the sending of the first processed data reception command information of S663 and repeat the receiving of processed data of S665 until the module indicated by the module identification information stored at the beginning of the FIFO memory has received the minimum data amount which can undergo data processing.

Second data processing P2 (S673 to S751) is a process for causing processed data processed in the first data processing P1, or processed data processed in the second data processing P2, to undergo further data processing in a data processing server comprising a module that is different from the module that was executing data processing until now.

In S673 to S685, a process is executed for uploading, to the data processing server that executes new data processing, the processed data received in S665 from the data processing server that was executing data processing until now. The contents of the processes S673, S675, S683, S685 are the same as the contents of the processes S573, S575, S583, S585 described above, with the exception that: the target data of data processing is processed data which has undergone at least one of the data processing; the upload message is sent from the mediation server 60; and an upload message including remaining processed data is sent from the mediation server 60 even after data processing by the data processing module has started in case the processed data included in the upload message sent by the mediation server 60 is the minimum data amount which can undergo data processing by the data processing module. Consequently, an explanation of the contents of the processes S673, S675, S683, S685 is hereby omitted.

In S719 to S751, processes are performed for executing data processing on data uploaded to the data processing server which executes new data processing. Except for the fact that the contents of the specific data processing differ, the contents of the processes are the same as the contents of the processes S619, S621, S631, S632, S633, S639, S651 described above, and consequently an explanation thereof is hereby omitted. Moreover, the second data processing P2 may be executed by communicating with either the first data processing server 200 or the second data processing server 300. After S751, process returns to S654.

In case of negative determination in S659 (S659: NO), in S752 the CPU 72 of the mediation server 60 determines whether an output destination of the processed data that has undergone data processing is the multi-function peripheral 10. For example, in case "download print", "Office download print" or "PDF download print" has been selected as the basic function, or in case "enclosing copy" has been selected as the application function, it may be determined that the multi-function peripheral 10 is the output destination of the data. Further, in case "scan upload", "Office conversion upload" or "PDF conversion upload" has been selected as the basic function, or in case "enclosing scan" or "folded memo scan" has been selected as the application function, it may be determined that the contents server is the output destination of the data. The determination of S752 may be made based on the module identification information included in the parameter information. The determination may be made based on the application identification information, and the basic function identification information that are stored separately from the parameter information. In case the output destination of the data is the multi-function peripheral 10 (S752: YES), the process continues to S753.

The process S753 to S773 is a process for causing the multi-function peripheral 10 to print the processed data that has undergone data processing by the first data processing server 200 or the second data processing server 300. In S753, the CPU 72 of the mediation server 60 generates second processed data reception command information. The second processed data reception command information is information notifying the multi-function peripheral 10 that data processing by the data processing module which is last in the data processing sequence has completed a prescribed data amount of the beginning part (S732: YES).

In receiving the second processed data reception command information, in S757 the CPU 72 sends the second processed data reception command information to the multi-function peripheral 10. In S759, the CPU 22 of the multi-function peripheral 10 sends first download source URL request information and the processed data reception information request information to the mediation server 60. The first download source URL request information is information to request of the mediation server 60 a first download source URL to access processed data for which data processing completion confirmation was executed in S731. Further, the processed data reception information request information is information for identifying the job which has generated the processed data for which data processing completion confirmation was executed in S731.

In S761, the CPU 72 generates the first download source URL and the processed data reception information for receiving processed data from the data processing server which comprises the data processing module which executed the last processing of the processed data, and sends the first download source URL and the processed data reception information to the multi-function peripheral 10.

In S763, download request information to download the processed data identified by the processed data reception information is sent, based on the first download source URL, to the first data processing server 200 or the second data processing server 300 by the CPU 22 of the multi-function peripheral 10. In S765, the CPU of the data processing server causes the processed data specified by the download request information to be sent to the multi-function peripheral 10. Moreover, the processes S763 and S765 may be executed by communicating with either the first data processing server 200 or the second data processing server 300.

In the data processing server, when the data processing is executed for 100 KB at a time, in S765 the processed data may be sent 100 KB at a time to the multi-function peripheral 10 in response to the download request information sent in S763. In this case, the CPU 22 of the multi-function peripheral 10 may repeat the sending of the download request information of S763, and repeat the receiving of the processed data of S765 until the minimum data amount which can undergo print processing by the print executing unit has been received. The minimum data amount which can undergo print processing by the print executing unit may be an amount sufficient to cause one carriage pass of an ink head in case the print executing unit 18 is an ink jet printer, and an amount sufficient to print one page of printing paper in case the print executing unit 18 is a laser printer.

In S767, the CPU 22 of the multi-function peripheral 10 causes the print executing unit 18 to execute the print process. The print process may be executed using a smallest printable unit of the print data. For example, in case the print executing unit 18 is the ink jet printer, the print process may be executed in units of lines. In case the print executing unit 18 is the laser printer, the print process may be executed in one page units of printing paper.

When the print process of the processed data is complete, in S769 the CPU 22 sends print completion notification information, indicating that the print process has been completed, to the mediation server 60. In S771, the CPU 72 of the mediation server 60 sends process completion notification information to the multi-function peripheral 10. In S773, the CPU 22 of the multi-function peripheral 10 causes a completion screen to be displayed on the display unit 14. Thus, the flow ends.

On the other hand, in case it is determined in S752 that the output destination of the processed data which underwent data processing by the data processing server is not the multi-function peripheral 10 (S752: NO), the process continues to S853 (see FIG. 7) in order to output the processed data to the contents server.

In S853, the CPU 72 of the mediation server 60 generates third processed data reception command information for receiving processed data from the data processing server which comprises the data processing module which executed the last processing on the processed data, and sends the generated third processed data reception command information to the data processing server.

In S855, the CPU of the data processing server sends the processed data specified by the third processed data reception command information to the mediation server 60. In the data processing server, in case the data processing is executed 100 KB at a time, in S855 the processed data may be sent 100 KB at a time to the mediation server 60 in response to the third processed data reception command information sent in S853. In this case, the CPU 72 of the mediation server 60 may repeat the sending of the third processed data reception command information of S853, and repeat the receiving of the processed data of S855 until the minimum data amount which can be sent to the contents server has been received. Moreover, the processes S853 and S855 may be executed by communicating with either the first data processing server 200 or the second data processing server 300.

In S857, the CPU 72 of the mediation server 60 sends save upload destination URL reception request information to the contents server 100. The save upload destination URL reception request information is information to request a save upload destination URL, which is information necessary to perform uploading to the contents server 100. In S859, the CPU 72 receives a save upload destination URL sent from the contents server 100. In S861, the CPU 72 of the mediation server 60 sends processed data to the contents server 100. In S863, the CPU 72 receives save upload result information sent from the contents server 100. The save upload result information is information indicating whether the processed data has been stored normally on the contents server 100.

In S865, the CPU 72 decodes the save upload result information and creates a decoding result. When the processed data is being stored normally, a decoding result is obtained indicating that the processed data is being stored normally. In case the processed data was not stored normally, e.g., in case the data size of the uploaded processed data exceeds the data size which can be stored on the contents server 100, a decoding result is created indicating that the capacity was exceeded.

In S867, the CPU 72 of the mediation server 60 sends processing completion notification information to the multi-function peripheral 10. The processing completion notification information includes data to cause the display unit 14 of the multi-function peripheral 10 to display the decoding result. In S869, the CPU 22 of the multi-function peripheral 10 causes the display unit 14 to display the decoding result based on the processing completion notification information. Then, the flow of processing is ended.

Figure 8:
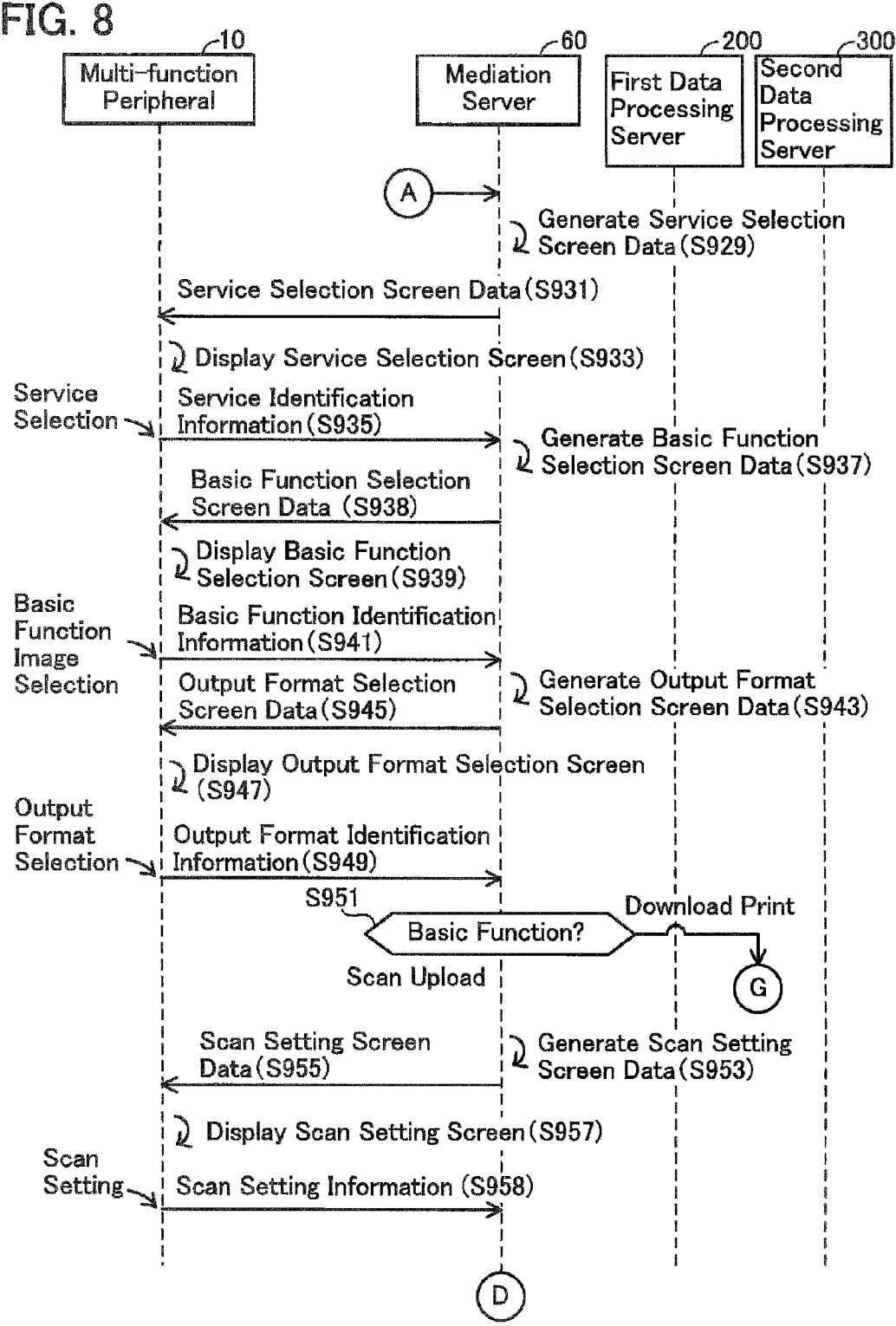
FIG. 8 shows a sequence diagram of various processing executed by each device.

On the other hand, in case the function identification information indicates basic function (S514: basic function) in S514 (see FIG. 2), the CPU 72 of the mediation server 60 proceeds to S929 (see FIG. 8). The contents of steps S929, S931, S933 are the same as the contents of the steps of S533, S535, S536, described above, and consequently a description thereof is hereby omitted.

In S935, as in S537, the CPU 22 of the multi-function peripheral 10 sends, to the mediation server, service identification information corresponding to the button image selected by the user.

In S937, the CPU 72 of the mediation server 60 generates basic function selection screen data for causing a basic function selection screen 213 to be displayed. In S938, the CPU 72 of the mediation server 60 sends the basic function selection screen data to the multi-function peripheral 10.

Figure 15:
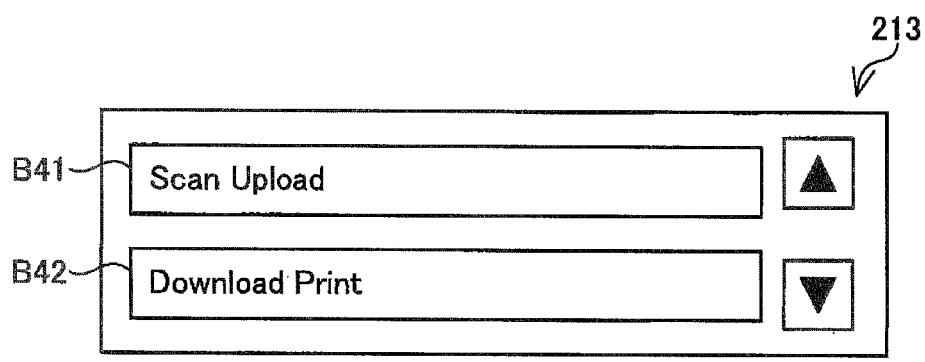
FIG. 15 shows an example of a basic function selection screen display.

In S939, the CPU 22 of the multi-function peripheral 10 causes the basic function selection screen 213 to be displayed on the display unit 14. As shown in FIG. 15, the basic function selection screen 213 includes button images B41 and B42.

The button image B41 is an image for receiving selection of the basic function "scan upload". "Scan upload" is a function for uploading the scan data generated by the multi-function peripheral 10 to a service selected in S933. The button image B42 is an image for receiving selection of the basic function "download print". "Download print" is an application for executing the print process in the multi-function peripheral 10 using the image data downloaded from the service selected in S933.

When an operation for selecting the button image B41 or B42 is performed in the multi-function peripheral 10, in S941 the CPU 22 sends, to the mediation server 60, basic function identification information indicating the basic function corresponding to the selected button. An example of the basic function identification information may be "scan upload", which is the name of the button image B41. That is, the basic function identification information may be information indicating the selected button. Moreover, the basic function identification information may include device format information corresponding to the format of the scan data outputted by the multi-function peripheral 10. The device format information may be information indicating the default format described earlier.

In S943, the CPU 72 of the mediation server 60 generates output format selection screen data. An output format selection screen is a screen for receiving selection of the format of the output data. In case the selected basic function is "scan upload", the data to be uploaded to the service is the output data, and in case the selected basic function is "download print", the data to be downloaded by the multi-function peripheral 10 is the output data. In S945, the CPU 72 sends the output format selection screen data to the multi-function peripheral 10. In S947, the CPU 22 of the multi-function peripheral 10 causes the output format selection screen to be displayed on the display unit 14. The CPU 22 receives the input of format from the user via the operating unit 12. Example of the format are JPEG, Office format, PDF, GIF, etc. Moreover, "no format conversion" may also be selected in the output format selection screen.

In receiving the selection of output format from the user, in S949 the CPU 22 sends, to the mediation server, the output format identification information which identifies the output format selected by the user. In S951, based on the basic function identification information, the CPU 72 of the mediation server 60 determines whether which of the basic functions has been selected. In case of "scan upload" (S951: scan upload), the process proceeds to S953. In S953, the CPU 72 of the mediation server 60 generates scan setting screen data for causing a scan setting screen to be displayed. The scan setting screen is a screen for receiving input of various settings for scanning (e.g., a format of the scan data generated by the multi-function peripheral 10, resolution, color mode, etc.).

In S955, the CPU 72 sends the scan setting screen data to the multi-function peripheral 10. In S957, the CPU 22 of the multi-function peripheral 10 causes the scan setting screen to be displayed on the display unit 14. The CPU 22 receives the various scan settings from the user via the operating unit 12.

In S958, the CPU 22 sends the scan setting information to the mediation server 60. The scan setting information is information indicating various settings given by the user, and may include setting format information for identifying a setting format which, from among the formats of scan data which can be generated by the multi-function peripheral 10, is the format set by the user. The extension is an example of the setting format information. Thus, the process proceeds to S539 (see FIG. 3).

On the other hand, in case the CPU 72 of the mediation server 60 determines in S951 that "download print" has been selected (S951: download print), the process proceeds to S31. In S31, the CPU 72 sends data information request information to the contents server 100. The data information request information is information for requesting data information. The data information is information to identify each of the plurality of data that is being stored in the selected contents server. A file name is an example of the data information. In receiving the data information request information from the mediation server 60, in S33 the contents server 100 sends the data information to the mediation server 60.

In S34, based on the data information received in S33, the CPU 72 of the mediation server 60 generates data selection screen data for causing a data selection screen 221 to be displayed. The data selection screen is a screen for causing the user to select data to be downloaded. In S35, the CPU 72 sends the data selection screen data to the multi-function peripheral 10.

In receiving the data selection screen data from the mediation server 60, in S37 the CPU 22 of the multi-function peripheral 10 causes the data selection screen to be displayed on the display unit 14. Thus, the CPU 22 receives a process for selecting selection data from the plurality of data that is being stored on the contents server 100. The selection data is data selected as a downloading target from the contents server 100. The CPU 22 may receive a process for selecting a plurality of selection data. By operating the operating unit 12, the user selects a button image from the data selection screen for accessing the data he wishes to download. An example of the button image for accessing the data which the user wishes to download is a button image including and displaying an image data file name. The button image may include and display a thumbnail of image data corresponding to the button.

In S41, the CPU 22 of the multi-function peripheral 10 sends, to the mediation server 60, data selection indication information corresponding to the button image selected by the user. The data selection indication information is information for identifying the selection data. In the illustrative example of the present embodiment, information is sent indicating that data corresponding to a button image B21 has been selected. The data selection indication information may be described by the URL description method.

In S53, the CPU 72 of the mediation server 60 sends data detail information request information for requesting the data detail information to the contents server 100. Examples of the data detail information are the extension indicating the format of the selection data, data modification date, data size, etc.

In S55, the CPU 72 receives the data detail information from the contents server 100. In case a plurality of selection data was selected in S37, the data detail information is received for each of the plurality of selection data.

In S73, the CPU 72 of the mediation server 60 sends download source URL request information to the contents server 100. The download source URL request information is information requesting a download source URL for accessing the selection data identified by the data selection indication information received in S41. In receiving the download source URL request information from the mediation server 60, the contents server 100 first refers to the data storage area 101, and specifies the download source URL for accessing the selection data specified by the download source URL request information. In S75, the contents server 100 sends the specified download source URL to the mediation server 60.

In S79, the CPU 72 of the mediation server 60 sends the download request information to the contents server 100. The download source URL received in S75 is included in the download request information. The download request information is information for requesting, from the contents server 100, the selection data specified by the download source URL. In S81, the contents server 100 sends the selection data specified by the download source URL to the mediation server 60.

In S93 to S101, processes are executed for receiving the selection of processes. The contents of processes S93, S95, S97, S101 are the same as the contents of processes S539, S541, S543, S544, described above, and consequently a description thereof is hereby omitted.

In S102, the CPU 72 of the mediation server 60 executes the module indication process. The contents of the module indication process are the same as the contents of S559, described above, and consequently a description thereof is hereby omitted.

In S111 to S117, an upload execution process is executed to upload the selected data received from the contents server in S81 to the data processing server which executes data processing. The contents of the processes S111, S113, S115, S117 are the same as the contents of the processes S573, S575, S583, S585 described above, with the exceptions that the target data is selected data, and that the selected data is sent from the mediation server 60. Consequently, a description of the processes is hereby omitted. Moreover, the upload execution process (S111 to S117) may be performed by communicating with the second data processing server 300. Thus, process proceeds to S619 (see FIG. 4) in order to cause the data processing server to execute data processing on the selected data.

First Operation Example

A first operation example will be described. As an example, a case will be described in which "enclosing copy" was selected in the application selection screen displayed in S521 (see FIG. 2), and "monochrome processing" and "watermark processing" were selected in the process selection screen displayed in S543 (see FIG. 3). Further, a case will be described in which the data output from the multi-function peripheral 10 has JPEG format, and each of the processing modules corresponds to JPEG format.

Results of the module indication process executed in S559 (see FIG. 3) will be described. Since "enclosing copy" has been selected from the application functions (FIG. 10, S1112: YES), the module identification information of the enclosing processing module 381 is temporarily stored (FIG. 10, S1116). Further, it is determined that the format conversion process of the image data is not required (FIG. 10, S1120: NO). Because it is determined that the processing function of the image has been selected (FIG. 10, S1128: YES), and because it is determined that JPEG format, which is the format of the upload data output from the multi-function peripheral 10, is a format that can be processed by both the monochrome processing module 281 and the watermark processing module 283 (S1136: YES), the module identification information of the monochrome processing module 281 and the module identification information of the watermark processing module 283 are temporarily stored (S1132).

The reordering process is executed on the module identification information that was temporarily stored (S1144), and the module identification information of the enclosing processing module 381 is stored at the beginning of the FIFO memory. Next, the module identification information is stored in the FIFO memory in the order: the monochrome processing module 281, then the watermark processing module 283, in accordance with the priority table TB1 (see FIG. 11). Thus, the parameter information is created (S1148).

Figure 4:
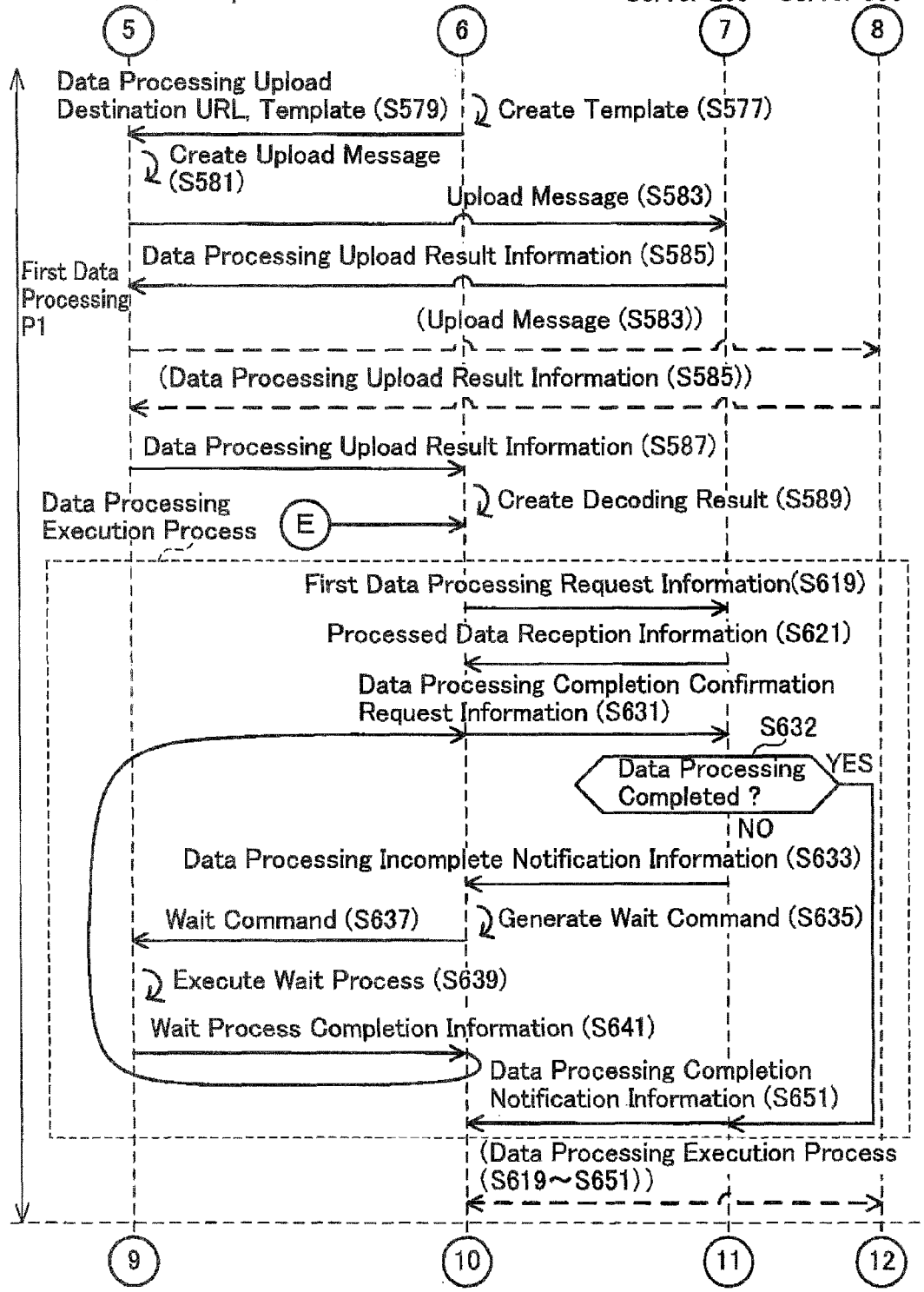
FIG. 4 shows a sequence diagram of various processing executed by each device.
Figure 5:
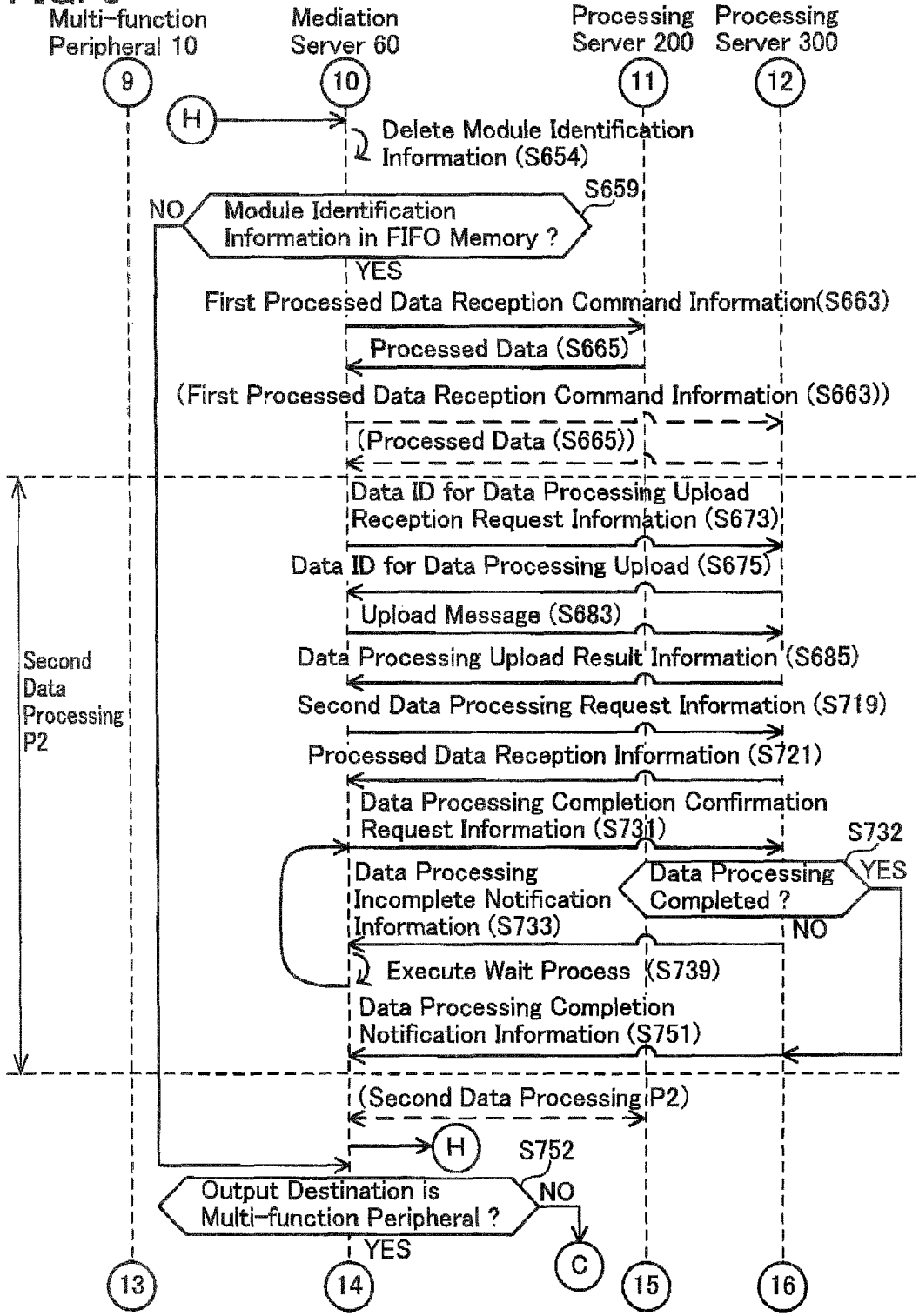
FIG. 5 shows a sequence diagram of various processing executed by each device.

Based on the FIFO memory or the parameter information, the mediation server 60 determines that the scan data generated by the multi-function peripheral 10 is to be processed by the data processing server (S572: YES). Thus, the multi-function peripheral 10 is caused to send the scan data to the second data processing server 300 that comprises the enclosing processing module 381 (FIG. 3 and FIGS. 4, S573 to S589), and to send the first data processing request information to the second data processing server 300 (FIGS. 4, S619 to S621). The first data processing request information identifies data of the portion within the scan data written on by a marker, and includes information indicating that the trimming process, or selective erasure process is to be executed based on the marker. Next, the mediation server 60 receives, from the second data processing server 300, the processed data which has undergone data processing by the enclosing processing module (FIG. 4, S631 to FIG. 5, S665), and causes second data conversion request information to be sent to the first data processing server 200, indicating that the processed data is to undergo monochrome processing and watermark processing by using the monochrome processing module 281, which is second in sequence of processing, and the watermark processing module 283, which is third in sequence of processing (FIGS. 5, S673 to S721). When the monochrome processing and watermark processing have been executed in sequence, and have been completed (FIGS. 5, S721 to S751), the mediation server 60 receives the processed data from the first data processing server 200 (S665).

Figure 6:
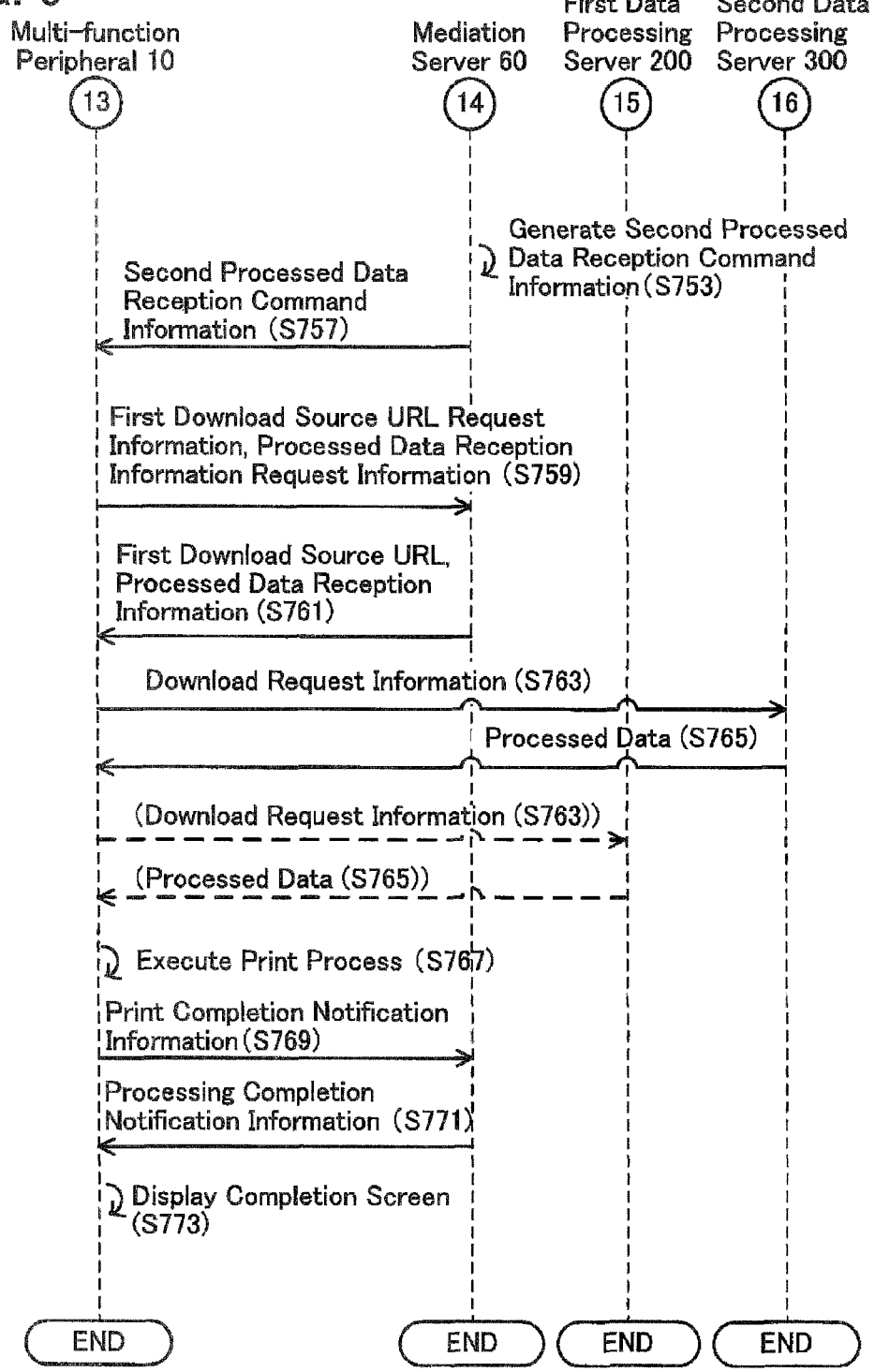
FIG. 6 shows a sequence diagram of various processing executed by each device.

Since the output destination of the data is the multi-function peripheral 10 (FIG. 5, S752: YES), the mediation server 60 causes the multi-function peripheral 10 to receive the processed data from the first data processing server 200 (FIGS. 6, S753 to S765). Thus, the multi-function peripheral 10 receives, from the first data processing server 200, the processed data which has undergone the enclosing process, monochrome processing, and watermark processing (FIGS. 7, S853 to S855), and prints the received processed data (FIG. 6, S767).

Second Operation Example

Figure 7:
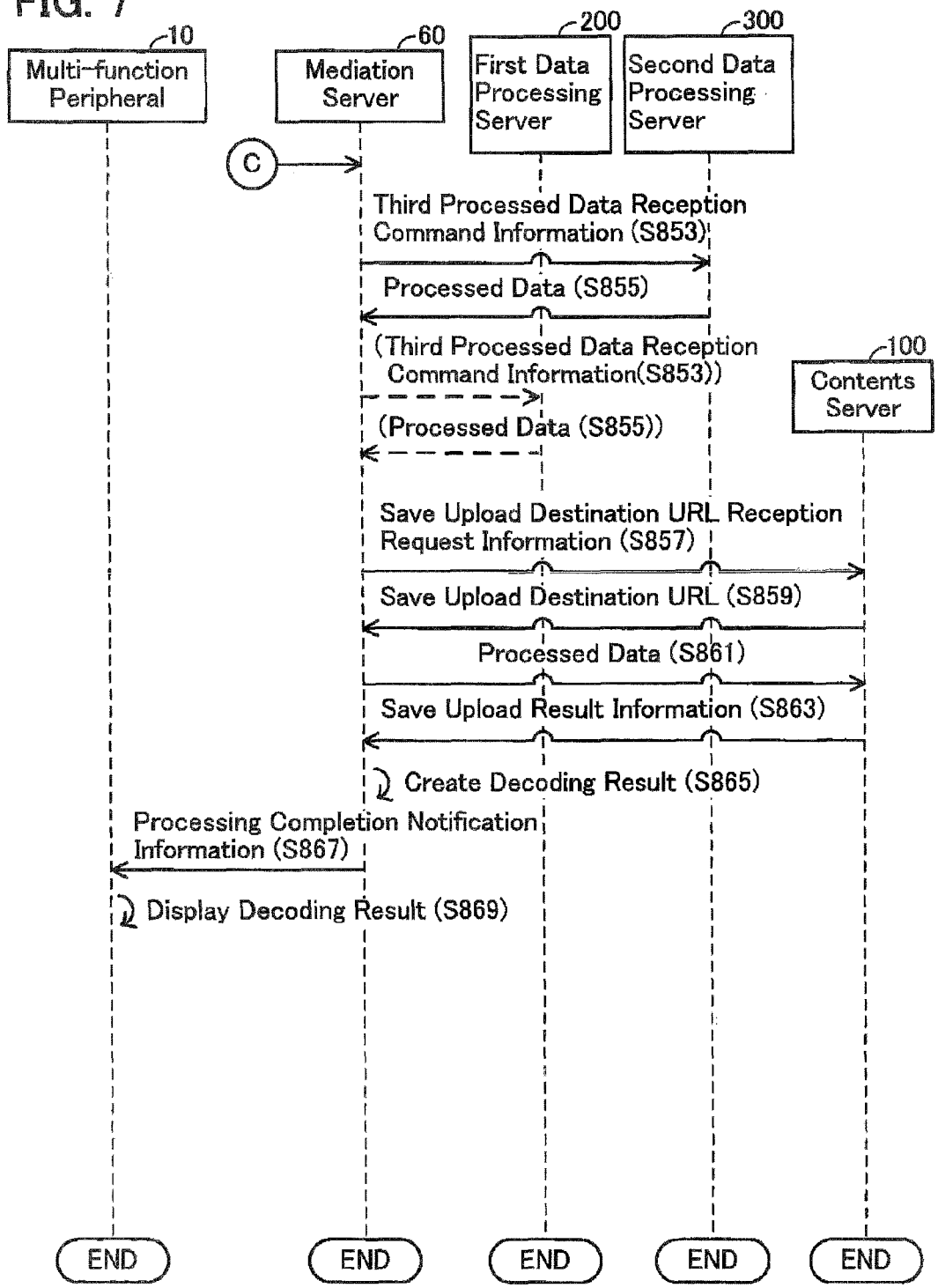
FIG. 7 shows a sequence diagram of various processing executed by each device.

A second operation example will be described. As an example, the second operation example differs from the first operation example in the point that "enclosing scan" is selected in the application selection screen displayed in S521 (see FIG. 2). The second operation example is the same as the first operation example in that the enclosing processing is executed by the second data processing server 300, and the monochrome processing and watermark processing are executed in sequence by the first data processing server 200 until completion. In the second operation example, since the output destination of the data is the contents server 100 (FIG. 5, S752: NO), the mediation server 60 receives, from the first data processing server 200, the processed data which has undergone the enclosing process, monochrome processing, and watermark processing (FIGS. 7, S853 to S855), and saves and uploads the received processed data to the contents server 100 (FIG. 7, S857 to S869).

Third Operation Example

A third operation example will be described. As an example, a case will be described in which "basic function" displayed in the main screen in S510 (see FIG. 2) is selected, and "download print" displayed in the basic function selection screen in S939 (see FIG. 8) is selected. Further, a case will be described in which contents data in Office format is selected as the selection data of the download target in the data selection screen displayed in S37 (see FIG. 9). Further, a case will be described in which "N in 1 processing" and "watermark processing" are selected in the process selection screen displayed in S97 (see FIG. 9). Further, a case will be described in which the multi-function peripheral 10 cannot decode Office format data. Further, a case will be described in which the N in 1 processing module 282 and the watermark processing module 283 cannot process Office format data, but can process JPEG format data.

Results of the module indication process executed in S102 (see FIG. 9) will be described. An application function is not selected (FIG. 10, S1112: NO). Because "download print" of the basic functions has been selected, and the format of the selection data is Office format, it is determined that the format conversion process of the image data is required (FIG. 10, S1120: YES), and the module identification information of the Office to JPEG conversion module 292 corresponding to "Office print" is stored temporarily. Because the processing function of the image has been selected (FIG. 10, S1128: YES), and because it is determined that JPEG format, which is a processed data format processed by the Office to JPEG conversion module, is a format that can be processed by both the N in 1 processing module 282 and the watermark processing module 283 (S1136: YES), the module identification information of the N in 1 processing module 282 and the module identification information of the watermark processing module 283 are temporarily stored (S1132).

The reordering process is executed on the module identification information that was temporarily stored (S1144), and the module identification information of the Office to JPEG module 292 is stored at the beginning of the FIFO memory. Next, the module identification information is stored in the FIFO memory in the order: the N in 1 processing module 282, then the watermark processing module 283, in accordance with the priority table TB1 (see FIG. 11). Thus, the parameter information is created (S1148).

When the parameter information has been created by the module indication process, the mediation server 60 sends the selection data received from the contents server 100 (FIG. 9, S53 to S81) to the first data processing server 200 that comprises the Office to JPEG module 292, the N in 1 processing module 282 and the watermark processing module 283 (FIG. 9, S111 to S117), and causes the first data processing request information, which instructs the selection data to undergo JPEG conversion, N in 1 processing, and watermark processing by using the Office to JPEG module 292, the N in 1 processing module 282 and the watermark processing module 283, to be sent to the first data processing server 200 (FIG. 4, S619 to S621). The JPEG conversion, N in 1 processing, and watermark processing are executed in sequence, and completed (S651).

Since the output destination of the data is the multi-function peripheral 10 (FIG. 5, S752: YES), the mediation server 60 causes the multi-function peripheral 10 to receive the processed data from the first data processing server 200 (FIG. 6, S753 to S765). Thereupon, the multi-function peripheral 10 receives the processed data which has undergone JPEG conversion, N in 1 processing and watermark processing from the first data processing server 200, and prints the received processed data (FIG. 6, S767).

Fourth Operation Example

A fourth operation example will be described. As an example, a case will be described in which "basic function" displayed in the main screen in S510 (see FIG. 2) is selected, and "scan upload" displayed in the basic function selection screen in S939 (see FIG. 8) is selected. Further, a case will be described in which "no format conversion" displayed in the output format selection screen in S947 (see FIG. 8) is selected. Further, a case will be described in which GIF format is selected as the setting format in the scan setting screen displayed in S957 (see FIG. 8). Further, a case will be described in which "monochrome processing" and "N in 1 processing" displayed in the process selection screen in S97 (see FIG. 9) are selected. Further, a case will be described in which the monochrome processing module 281 and the N in 1 processing module 282 cannot process data in GIF format, but can process data in JPEG format.

Results of the module indication process executed in S102 (see FIG. 9) will be described. An application function is not selected (FIG. 10, S1112: NO). Because "scan upload" of the basic functions has been selected, but conversion of the output format has not been selected, it is determined that the format conversion process of the image data is not required (FIG. 10, S1120: NO). Because it is determined that the processing function of the image has been selected (FIG. 10, S1128: YES), and the GIF format, which is the setting format, is a format which neither the monochrome processing module 281 nor the N in 1 processing module 282 can process, (S1136: NO), the module identification information of the unified format conversion module 294 is stored temporarily (S1140), and the module identification information of the monochrome processing module 281 and the module identification information of the N in 1 processing module 282 are stored temporarily (S1132).

The reordering process is executed on the module identification information that was temporarily stored (S1144), and the module identification information of the unified format conversion module 294 is stored at the beginning of the FIFO memory. Next, the module identification information is stored in the FIFO memory in the order of: the monochrome processing module 281, then the N in 1 processing module 282, in accordance with the priority table TB1 (see FIG. 11). Thus, the parameter information is created (S1148).

When the parameter information has been created by the module indication process, the mediation server 60 sends the selection data received from the contents server 100 (FIG. 9, S53 to S81) to the first data processing server 200 that comprises the Office to JPEG module 292, the N in 1 processing module 282 and the watermark processing module 283 (FIG. 9, S111 to S117), and causes the first data processing request information, which instructs the selection data to undergo JPEG conversion, N in 1 processing, and watermark processing by using the Office to JPEG module 292, the N in 1 processing module 282 and the watermark processing module 283, to be sent to the first data processing server 200 (FIG. 4, S619 to S621). The JPEG conversion, N in 1 processing, and watermark processing are executed in sequence, and completed (S651). Subsequently, the unified format conversion, monochrome processing, and N in 1 processing are executed in sequence by the first data processing server 200. Thus, the mediation server 60 receives the processed data from the first data processing server 200 (FIG. 7, S853 to S855), and saves and uploads the received processed data to the contents server 100 (FIG. 7, S857 to S869).

Fifth Operation Example

A fifth operation example will be described. As an example, the point of selecting "Office format" in the output format selection screen displayed in S947 (see FIG. 8) differs from the first operation example. In the fifth operation example, the unified format conversion, monochrome processing, watermark processing, and JPEG to Office conversion are executed in sequence by the first data processing server 200. Thus, the mediation server 60 receives the processed data from the first data processing server 200 (FIG. 7, S853 to S855), and saves and uploads the received processed data to the contents server 100 (FIG. 7, S857 to S869).

(Effects)

According to the mediation server 60 described in the present specification, it is possible to cause various modules with which the first data processing server 200 and the second data processing server 300 are provided to execute data processing on data output from the multi-function peripheral 10 or contents server. Thus, it becomes possible to execute various processes which cannot be executed by the multi-function peripheral 10 (e.g., monochrome process, enclosing process, format changing process, etc.), and various format changing processes which cannot be executed by the multi-function peripheral 10 (e.g., changing process from Office format to JPEG format, etc.). Thus, it becomes possible to perform a process to execute uploading of data having a format that the multi-function peripheral 10 cannot decode nor create from the multi-function peripheral 10 to a server, or to execute a process in which data having a format that the multi-function peripheral 10 cannot decode is downloaded from a server and printed by the multi-function peripheral 10, etc.

According to the mediation server 60 described in the present specification, in case both a process and a format changing process are to be executed on the data, the processing module and the format changing module are specified such that the process is executed before the format changing process (S1132, S1124). Thus, it is possible to restrict the required number of data formats corresponding to the processing modules.

According to the mediation server 60 described in the present specification, in case the format of data to be processed by the process module is a format that the process module cannot process (S1136: NO), the unified format conversion module 294 is caused to execute a process to convert the format of the data into the unified format that the process module can process (S1140). Thus, it is possible to restrict the required number of data formats corresponding to the process modules.

According to the mediation server 60 described in the present specification, a plurality of processes to be executed in sequence on one data can be executed according to the priority being stored in the priority table TB1 (S1144). Thus, for example, since the process which more greatly reduces the data amount between before and after processing can be executed first, it is possible to execute the next process in a state having a reduced data amount, allowing a reduction in the processing load of the process.

According to the mediation server 60 described in the present specification, the data is outputted to the first data processing server 200 (S583) and a first process is executed thereon, and the data which underwent the first process can be received from the first data processing server 200 (S665). Next, the data which underwent the first process is outputted to the second data processing server 300 (S683), a second process is executed thereon, and the data which underwent the second process can be received by the multi-function peripheral 10 from the second data processing server 300 (S755). Thus, it becomes possible to cause each of the processes of the first data processing server 200 and the second data processing server 300 to be executed in sequence.

In the mediation server 60 described in the present specification, during execution of various processing, the wait command to cause the multi-function peripheral 10 to wait for the completion of the processing can be sent to the multi-function peripheral 10 (S637). Hence the situation in which the timeout or other error occurs in the multi-function peripheral 10 can be prevented.

While specific embodiments of the present invention have been described in detail above, such description is for illustrative purposes only and is not intended to limit the scope and claims of the invention. Techniques described in the claims of the invention include various modifications and changes made to the specific examples illustrated above. Variants according to the above embodiments are listed below.

(Variants)

Three or more data processing servers may be present. For example, in case processing is to be executed in sequence by N (N is a natural number of 2 or more) data processing servers, processed data processed by an N−1-th data processing server may be passed to an N-th data processing server. Thus, the processed data may be output to the multi-function peripheral 10 or the contents server in response to the completion of data processing by the last data processing server.

Processing for specifying the unified format conversion module 294 as the execution target module (S1140) may be omitted. In this case, S1136 and S1140 is omitted, and processing may proceed from S1128 to S1132. Further, the reordering process (S1144) may be omitted. In this case, S1144 is omitted, and processing may proceed from S1124 to S1148. The process of sending the wait command to the multi-function peripheral 10 (S637) may be omitted. In this case, S635 to S641 is omitted, and processing may return from S633 to S631. From the above, generally speaking, the mediation server 60 may comprise at least a "first receiving module", a "data processing module", and a "second receiving module". As a specific example, the multi-function peripheral 10 may execute at least S102, S204 and S344.

In case one or more of the basic processing modules cannot process JPEG format data, in S1136 the CPU 72 may execute processing as follows. First, the execution order of the basic processing modules is determined so as to follow the priority being stored in the priority table TB1. For example, in case an application function has been selected, and the first ranked basic processing module can process only bitmap format data, the identification information of the conversion module that converts data in JPEG format into data in bitmap format is stored as the identification information of the unified format conversion module. In this case, in S1144 the CPU 72 determines the execution order of the execution target module as follows: any of the application processing modules, the conversion module that converts data in JPEG format into data in bitmap format, the basic processing module.

The first data processing server 200 or the second data processing server 300 may comprise various conversion modules. For example, the first data processing server 200 or the second data processing server 300 may comprise a conversion module that converts data in Office format into Page Description Language (referred to as PDL) format as a module corresponding to "Office print". Further, the first data processing server 200 or the second data processing server 300 may comprise a conversion module that converts data in PDF format into PDL format as a module corresponding to "PDF print".

The "enclosing scan" application function may comprise various functions. For example, a preview image based on the scan data may be displayed on the multi-function peripheral 10, and specification of a selected range may be received by a touch panel input to the displayed preview image. Thus, various processes may be executed by the first data processing server 200, etc. on an image within the selected range.

In the application selection screen 211 illustrated in FIG. 13, not only the selection of an application may be received, but the selection of various processes may be received. For example, buttons corresponding to "Office conversion upload", "PDF conversion upload", "Office download print" and "PDF download print" may be displayed in the application selection screen 211. Further, in case any one of "Office conversion upload", "PDF conversion upload", "Office download print", "PDF download print" has been selected, in S532 the CPU 72 may determine that the basic function has been re-selected. Then processing may proceed to S929.

Figure 2:
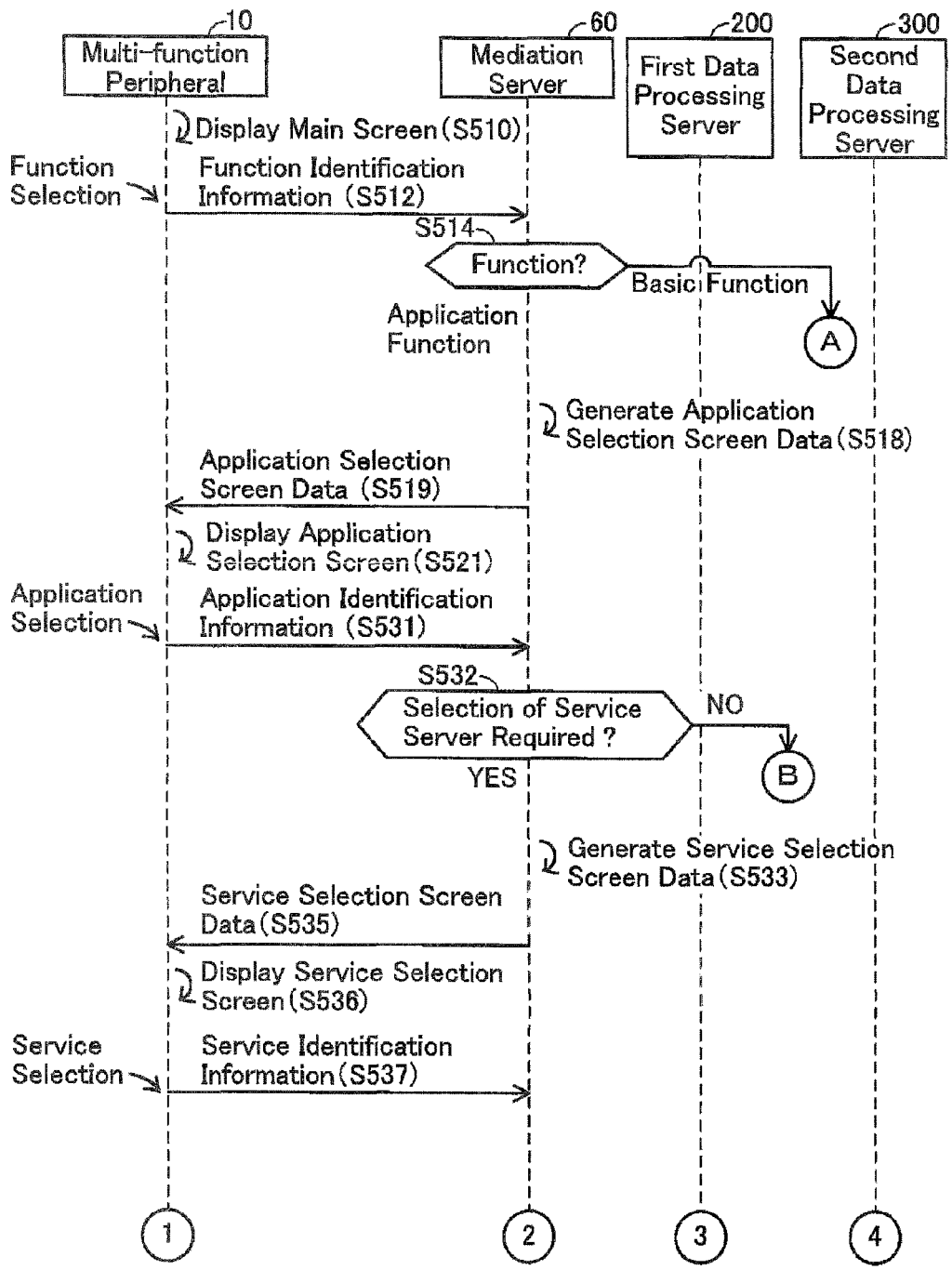
FIG. 2 shows a sequence diagram of various processing executed by each device.
Figure 3:
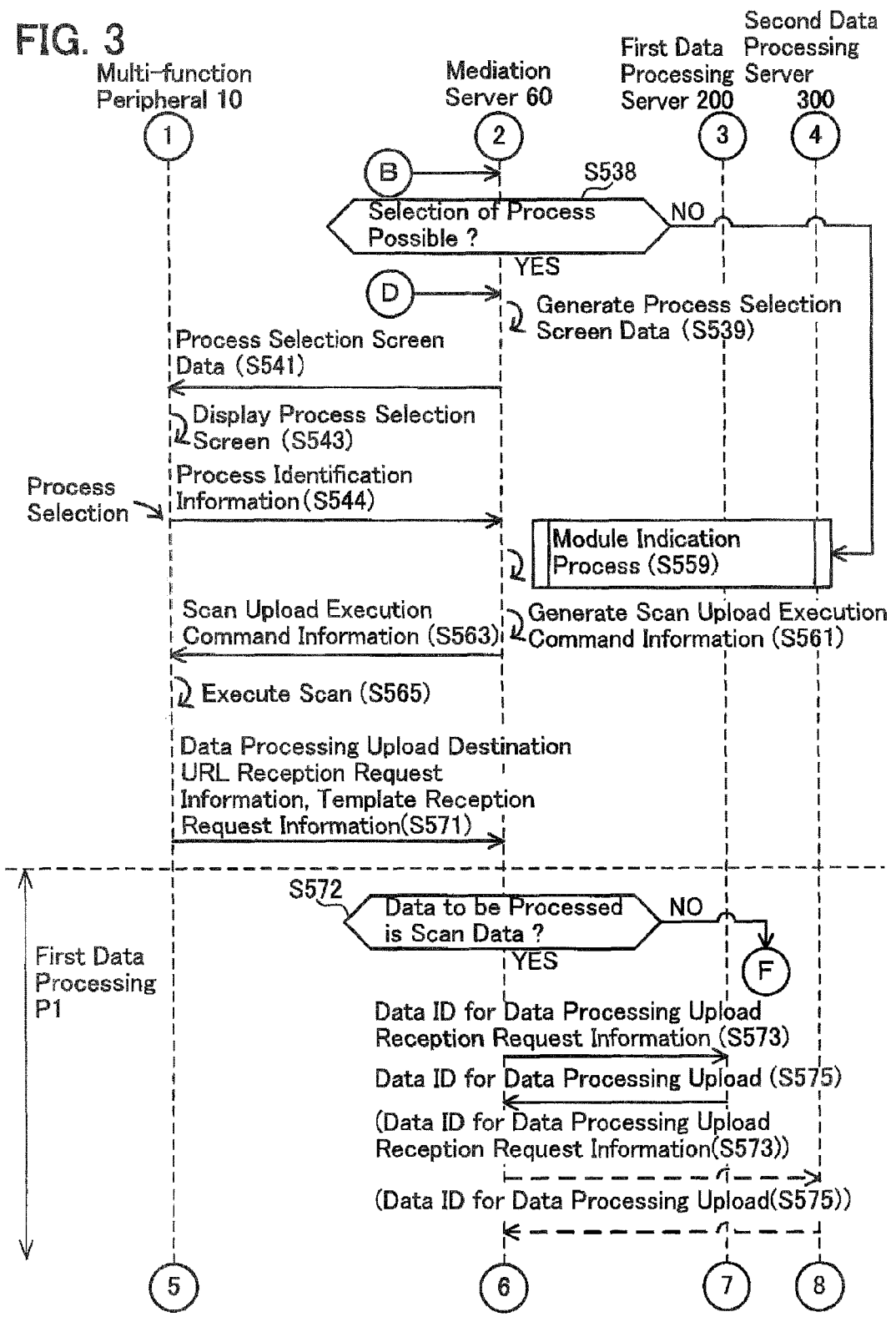
FIG. 3 shows a sequence diagram of various processing executed by each device.
Figure 9:
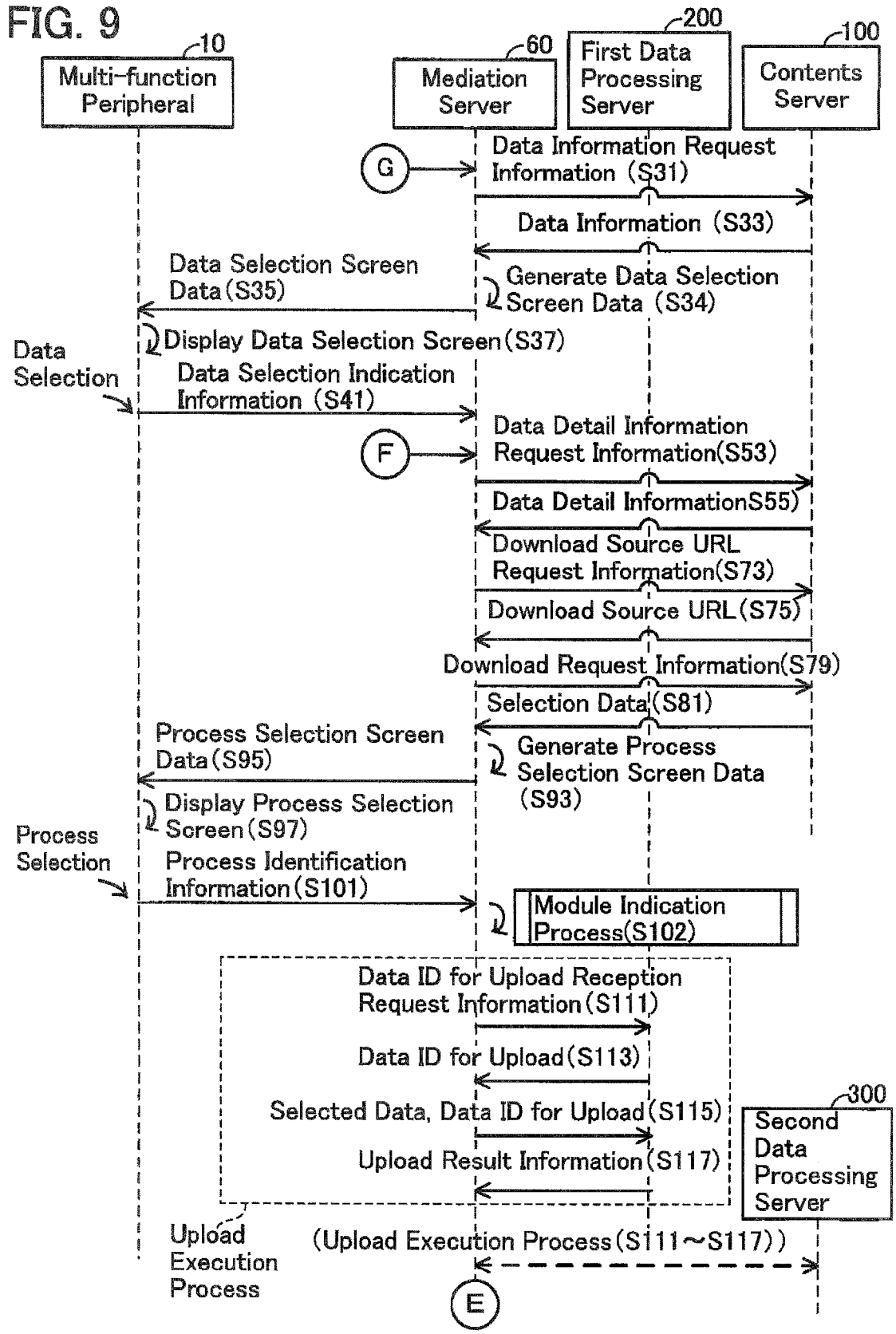
FIG. 9 shows a sequence diagram of various processing executed by each device.

A processing download application function may be included in the application functions. The processing download application function is a function for causing monochrome processing, N in 1 processing, or other processing to be executed by a processing module on the contents data being stored in the service server, and causing the processed image data to be downloaded to the multi-function peripheral 10. Specifically, in case the application function selected in S518 to S531 of FIG. 2 is the processing download application function, the same processes as in S533 to S537 of FIG. 2 are executed, and a service may be selected by the user. After the user has selected the service, the same processes as in S31 to S41 of FIG. 9 are executed, and the mediation server 60 may receive the contents data. The contents data may be processed by the data processing module corresponding to the processing download application function in the same order as S619 to S651 of FIG. 4, or S719 to S751 of FIG. 5. The processed processed data may be received by the multi-function peripheral 10 in the same order as S753 to S765 of FIG. 6.

S539 to S544 may be omitted. In this case, in the module indication process of S559, the process of selecting a module corresponding to "monochrome processing", "N in 1 processing", or "watermark processing" is not executed.

The data processing upload destination URL which the CPU 72 sends to the multi-function peripheral 10 in S579 is not limited to a URL of a data processing server but a URL of a recording medium which the data processing server can access.

In S619, even in a case that module identification information of modules provided on the same data processing server is being stored sequentially in the FIFO memory, it is possible to request processing to be executed in only the module having the module identification information stored at the beginning of the FIFO memory.

The processes S943 to S949 may be executed only at the time of "scan upload". In this case, the format of the output data in "download print" may be JPEG format.

In the present embodiment, a case was explained in which contents servers 100 and 110 are connected to the Internet 6; but three or more contents servers may be connected to the Internet 6.

In the embodiment, the case is described in which the CPUs 22, 72, 272 and 372 of the multi-function peripheral 10, the mediation server 60, the first data processing server 200 and the second data processing server 300 execute processing according to software, but is not limited thereto. At least a part of functions provided according to the software may be provided by hardware such as a logic circuit.

A concept that includes the mediation server 60, the first data processing server 200 and the second data processing server 300 may be referred to as a "relaying device". That is, the "relaying device" as claimed may include the configuration including the mediation server 60, the first data processing server 200 and the second data processing server 300 as described in the specification.

The invention claimed is:

1. A relaying device comprising:
a network interface configured to connect with a network;
a processor coupled to the network interface; and
a memory storing instructions, the instructions, when executed by the processor, causing the relaying device to perform:

receiving via the network interface, from a image processing device which is connected with the network, process identification information;

identifying a data process as a selected data process in accordance with the process identification information, the selected data process being at least one data process selected from among a plurality of data processes in the image processing device, the plurality of data processes being executed on output data outputted from the image processing device or the server; and identifying an instruction-module as a selected instruction-module from among a plurality of instruction-modules in accordance with the selected data process, the selected instruction-module being capable of executing the selected data process;

executing the selected instruction-module so as to execute the selected data process on the output data;

transmitting processed data to a server which is connected with the network in a case that the output data is outputted from the image processing device, the processed data being data created by the selected instruction-module executing the selected data process on the output data; and transmitting the processed data to the image processing device in a case that the output data is outputted from the server.

2. The relaying device as in claim 1, wherein
the execution includes executing the selected instruction-module so as to execute the selected data process, in a case that the output data outputted from the image processing device is first data and the processed data created by the selected data process is second data, or in a case that the output data is third data that cannot be decoded by the image processing device, the first data is created by a data process that the image processing device is capable of executing, and the second data is created by a data process that the image processing device is incapable of executing.

3. The relaying device as in claim 1, wherein
the plurality of data processes includes:
   a particular process for creating processed image data based on the output data, the processed image data being image data for forming an image in which processing has been executed on an image formed based on the output data; and
   a format changing process for changing a format of the output data,
the plurality of instruction-modules includes:
   a particular process instruction-module for executing the particular process; and
   a format changing process instruction-module for executing the format changing process,
wherein the identification of the selected instruction-module includes:
   identifying the particular process instruction-module to be included in the selected instruction-module in a case that the particular process is included in the selected data process; and
   identifying the format changing process instruction-module to be included in the selected instruction-module in a case that the format changing process is included in the selected data process.

4. The relaying device as in claim 3, wherein
in a case that the particular process and the format changing process are included in the selected data process,
the identification of the selected instruction-module includes identifying the particular process instruction-module and the format changing process instruction-module to be included in the selected instruction-module, and the execution includes:
   executing the particular process instruction-module so as to execute the particular process on the output data; and
   executing the format changing process instruction-module so as to execute the format changing process on the processed image data processed by the particular process instruction-module.

5. The relaying device as in claim 3, wherein
in a case that a format of the output data on which the particular process instruction-module is to execute the particular process is a format that the particular process instruction-module is incapable of processing, the execution includes executing the format changing process instruction-module so as to execute a format conversion process before the execution of the particular process,
   the format conversion process being for converting the format of the output data into a format that the particular process instruction-module is capable of processing.

6. The relaying device as in claim 4, wherein the execution of the selected instruction-module includes:
   executing the format changing process instruction-module so as to execute the format conversion process to convert the format of the output data into a format that the particular process instruction-module is capable of processing, and executing the particular process instruction-module so as to execute the particular process on the data processed by the format changing process instruction-module, in the case that the particular process and the format changing process are included in the selected data process when the format of the output data is a format that the particular process instruction-module is incapable of processing; and
   executing the particular process instruction-module so as to execute the particular process on the output data, and executing the format changing process instruction-module so as to execute the format changing process on the processed image data processed by the particular process instruction-module, in the case that the particular process and the format changing process are included in the selected data process when the format of the output data is a format that the particular process instruction-module is capable of processing.

7. The relaying device as in claim 5, wherein the execution of the selected instruction-module includes:
   executing the format changing process instruction-module so as to execute the format conversion process to convert the format of the output data into a format that the particular process instruction-module is capable of processing, and executing the particular process instruction-module to execute the particular process on the data processed by the format changing process instruction-module, in the case that the particular process and the format changing process are included in the selected data process when the format of the output data is a format that the particular process instruction-module is incapable of processing; and
   executing the particular process instruction-module so as to execute the particular process on the output data, and executing the format changing process instruction-module so as to execute the format changing process on the processed image data processed by the particular process instruction-module, in the case that the particular process and the format changing process are included in the selected data process when the format of the output data is a format that the particular process instruction-module is capable of processing.

8. The relaying device as in claim 3, wherein
the instructions further causes the relaying device to perform storing a priority of the plurality of particular processes in a storage unit, and
in a case that there is a plurality of selected particular processes, these being particular processes included in the selected data process,
the identification of the selected instruction-module includes identifying, a plurality of the particular process instruction-modules executing the plurality of selected particular processes, to be included in the selected instruction-modules, and
the execution includes executing the plurality of particular process instruction-modules so as to execute the plurality of selected particular processes in an order according to the priority.

9. The relaying device as in claim 1, further comprising:
a mediation server comprising a mediation server network interface configured to connect with the network; and
a plurality of conversion devices each of which comprising a conversion device network interface configured to connect with the network, each of the plurality of conversion devices comprising at least one of the plurality of instruction-modules,
wherein:
in a case that the output data is outputted from the image processing device,
at least one of the plurality of conversion devices receives the output data from the image processing device via the conversion device network interface and executes the selected data process on the received output data, and
the mediation server receives the processed data from the at least one of the plurality of conversion devices, and outputs the received processed data to the server via the mediation server network interface; and
in a case that the output data is outputted from the server,
at least one of the plurality of conversion devices receives the output data from the server via the conversion device network interface, and executes the selected data process on the received output data, and
the mediation server causes the image processing device to receive the processed data from the at least one of the plurality of conversion devices.

10. The relaying device as in claim 9, wherein
in a case that the execution includes causing each of the plurality of conversion devices to execute the selected data process in order when the output data is outputted from the image processing device, the mediation server:
causes a first conversion device to receive the output data from the image processing device, causes the selected data process to be executed on the received output data, and receives the processed data from the first conversion device;
outputs, to N-th (N is a natural number of 2 or more) conversion device, the processed data received from an N−1-th conversion device, and causes the N-th conversion device to execute the selected data process; and
receives the processed data from a last conversion device in response to the last conversion device being caused to execute the selected data process, and outputs the received processed data to the server, and
in the case that the execution of the selected instruction-module includes causing each of the plurality of conversion devices to execute the selected data process in order when the output data is outputted from the server, the mediation server:
causes the first conversion device to receive the output data from the server, causes the selected data process to be executed on the received output data, and receives the processed data from the first conversion device,
outputs, to N-th conversion device, the processed data received from an N−1-th conversion device, and causes the N-th conversion device to execute the selected data process; and
causes the image processing device to receive the processed data from a last conversion device in response to the last conversion device being caused to execute the selected data process.

11. The relaying device as in claim 10, wherein
the mediation server is configured to output data reception command information to the image processing device in response the last conversion device being caused to execute the selected data process,
the data reception command information being for causing the image processing device to receive the processed data from the last conversion device, and
the data reception command information is described by a Uniform Resource Locator (URL) description method.

12. The relaying device as in claim 1, wherein
the execution of the selected instruction-module includes transmitting a wait command to the image processing device, the wait command being configured to cause the image processing device to wait for completion of the selected data process during an execution period of the selected data process,
the transmission of the processed data to the server includes transmitting the processed data to the server in response to the completion of the selected data process, and
the transmission of the processed data to the image processing device includes transmitting the processed data to the image processing device in response to the completion of the selected data process.

13. The relaying device as in claim 1, wherein
the instructions further causes the relaying device to perform:
receiving upload result information transmitted from the server and indicating whether or not a storage process has succeeded,
the storage process being for storing, in the server, the processed data that the server was to receive;
determining whether or not the storage process has succeeded based on the received upload result information; and
transmitting, to the image processing device, information for displaying a determination result on a display unit provided in the image processing device.

14. An image processing device comprising:
a network interface configured to connect with a network; and
a control device coupled to the network interface and configured to perform:
identifying a data process as a selected data process, the selected data process being at least one data process selected from among a plurality of data processes, and the plurality of data processes being executed on output data outputted from the image processing device or a server which is connected with the network;

transmitting via the network interface, to a relaying device which is connected with the network, process identification information for identifying the selected data process;

transmitting via the network interface, to the relaying device, execution request information for causing the relaying device to execute:

identifying an instruction-module as a selected instruction-module from among a plurality of instruction-modules in accordance with the selected data process, the selected instruction-module being capable of executing the selected data process identified based on the process identification information;

executing the selected instruction-module so as to execute the selected data process on the output data; and transmitting processed data to a server which is connected with the network in a case that the output data is outputted from the image processing device, the processed data being data created by the selected instruction-module executing the selected data process on the output data; and receiving the processed data from the relaying device via the network interface in a case that the output data is outputted from the server.

15. A system comprising an image processing device and a relaying device, the image processing device comprising:
a first network interface configured to connect with a network; and
a control device coupled to the first network interface, the relaying device comprising:
a second network interface configured to connect with the network;
a processor coupled to the second network interface; and
a memory storing instructions, wherein
the control device of the image processing device is configured to perform:
identifying a data process as a selected data process, the selected data process being at least one data process selected from among a plurality of data processes, and the plurality of data processes being executed on output data outputted from the image processing device or a server which is connected with the network; and
transmitting, to the relaying device via the first network interface, process identification information for identifying the selected data process, the instructions, when executed by the processor of the relaying device, cause the relaying device to perform:
receiving the output data from the image processing device or the server via the second network interface;
receiving the process identification information from the image processing device via the second network interface;
identifying an instruction-module as a selected instruction-module from among a plurality of instruction-modules in accordance with the selected data process, the selected instruction-module being capable of executing the selected data process identified based on the process identification information;
executing the selected instruction-module so as to execute the selected data process on the output data;
transmitting processed data to the server in a case that the output data is outputted from the image processing device, the processed data being data created by the selected instruction-module executing the selected data process on the output data; and
transmitting the processed data to the image processing device in a case that the output data from the server is received in the receiving of the output data, the control device of the image processing device is further configured to perform receiving the processed data from the relaying device via the first network interface in a case that the processed data is outputted from the relaying device.

* * * * *